US010001995B2

(12) United States Patent
Van Dalen et al.

(10) Patent No.: US 10,001,995 B2
(45) Date of Patent: Jun. 19, 2018

(54) PACKED DATA ALIGNMENT PLUS COMPUTE INSTRUCTIONS, PROCESSORS, METHODS, AND SYSTEMS

(71) Applicant: Intel Corporation, Santa Clara, CA (US)

(72) Inventors: Edwin Jan Van Dalen, Eindhoven (NL); Alexander Augusteijn, Eindhoven (NL); Martinus C. Wezelenburg, Lubbeek (BE); Steven Roos, Eindhoven (NL)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 14/728,693

(22) Filed: Jun. 2, 2015

(65) Prior Publication Data
US 2016/0357563 A1 Dec. 8, 2016

(51) Int. Cl.
*G06F 9/30* (2018.01)
(52) U.S. Cl.
CPC ........ *G06F 9/30036* (2013.01); *G06F 9/3016* (2013.01); *G06F 9/30032* (2013.01)
(58) Field of Classification Search
CPC .. G06F 9/30036; G06F 9/3016; G06F 9/3001; G06F 9/30032
See application file for complete search history.

(56) References Cited

U.S. PATENT DOCUMENTS 6,446,195 B1 * 9/2002 Ganapathy ............ G06F 9/3001
708/501
2004/0267861 A1 12/2004 Gerwig et al.
2011/0153700 A1 * 6/2011 Gopal ................. G06F 9/30029
708/209
(Continued)

FOREIGN PATENT DOCUMENTS

WO 2016/195921 A1 12/2016

OTHER PUBLICATIONS

International Search Report and Written Opinion received for PCT Patent Application No. PCT/US2016/031422, dated Aug. 16, 2016, 15 pages.
(Continued)

*Primary Examiner* — Benjamin P Geib
(74) *Attorney, Agent, or Firm* — NDWE, LLP

(57) ABSTRACT

A processor includes a decode unit to decode a packed data alignment plus compute instruction. The instruction is to indicate a first set of one or more source packed data operands that is to include first data elements, a second set of one or more source packed data operands that is to include second data elements, at least one data element offset. An execution unit, in response to the instruction, is to store a result packed data operand that is to include result data elements that each have a value of an operation performed with a pair of a data element of the first set of source packed data operands and a data element of the second set of source packed data operands. The execution unit is to apply the at least one data element offset to at least a corresponding one
(Continued)

of the first and second sets of source packed data operands. The at least one data element offset is to counteract any lack of correspondence between the data elements of each pair in the first and second sets of source packed data operands.

16 Claims, 15 Drawing Sheets

(56) References Cited

U.S. PATENT DOCUMENTS

| | | |
|---|---|---|
| 2012/0233443 A1 | 9/2012 | Sebot et al. |
| 2012/0254589 A1 | 10/2012 | Corbal San Adrian et al. |
| 2014/0244967 A1 | 8/2014 | Ingle et al. |
| 2015/0095623 A1 | 4/2015 | Ermolaev et al. |

OTHER PUBLICATIONS

Intel, "Intel 64 and IA-32 Architectures Software Developer's Manual", vol. 1: Basic Architecture, Order No. 253665-040US, Oct. 2011, 548 pages.

Intel, "Intel 64 and IA-32 Architectures Software Developer's Manual", vol. 2 (2A, 2B & 2C): Instruction Set Reference, A-Z, Order No. 325383-040US, Oct. 2011, 1721 pages.

Intel, "Intel 64 and IA-32 Architectures Software Developer's Manual", vol. 3 (3A, 3B & 3C): System Programming Guide, Order No. 325384-040US, Oct. 2011, 1916 pages.

* cited by examiner

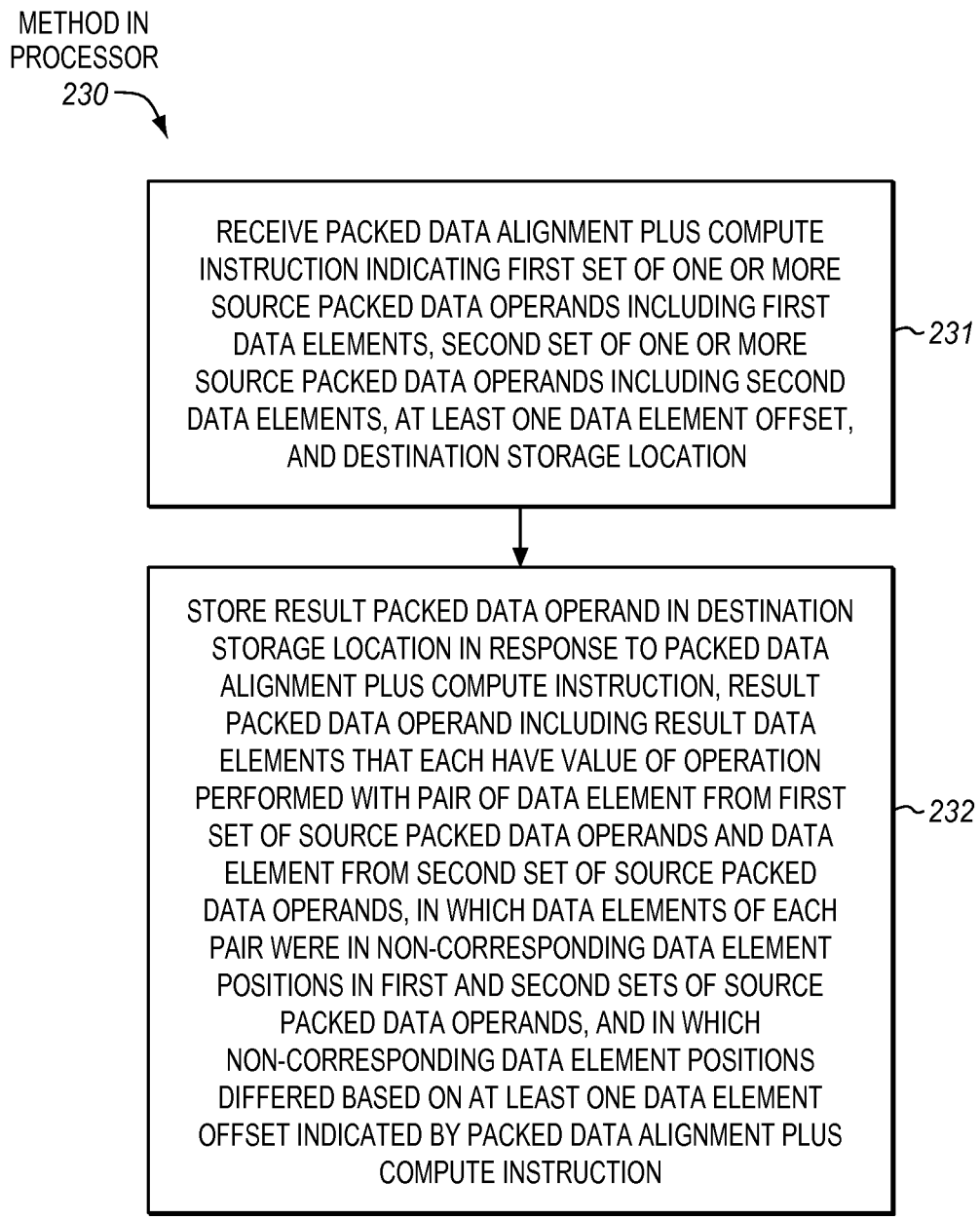

FIG. 2

METHOD IN
PROCESSOR
230

RECEIVE PACKED DATA ALIGNMENT PLUS COMPUTE INSTRUCTION INDICATING FIRST SET OF ONE OR MORE SOURCE PACKED DATA OPERANDS INCLUDING FIRST DATA ELEMENTS, SECOND SET OF ONE OR MORE SOURCE PACKED DATA OPERANDS INCLUDING SECOND DATA ELEMENTS, AT LEAST ONE DATA ELEMENT OFFSET, AND DESTINATION STORAGE LOCATION ~231

STORE RESULT PACKED DATA OPERAND IN DESTINATION STORAGE LOCATION IN RESPONSE TO PACKED DATA ALIGNMENT PLUS COMPUTE INSTRUCTION, RESULT PACKED DATA OPERAND INCLUDING RESULT DATA ELEMENTS THAT EACH HAVE VALUE OF OPERATION PERFORMED WITH PAIR OF DATA ELEMENT FROM FIRST SET OF SOURCE PACKED DATA OPERANDS AND DATA ELEMENT FROM SECOND SET OF SOURCE PACKED DATA OPERANDS, IN WHICH DATA ELEMENTS OF EACH PAIR WERE IN NON-CORRESPONDING DATA ELEMENT POSITIONS IN FIRST AND SECOND SETS OF SOURCE PACKED DATA OPERANDS, AND IN WHICH NON-CORRESPONDING DATA ELEMENT POSITIONS DIFFERED BASED ON AT LEAST ONE DATA ELEMENT OFFSET INDICATED BY PACKED DATA ALIGNMENT PLUS COMPUTE INSTRUCTION ~232

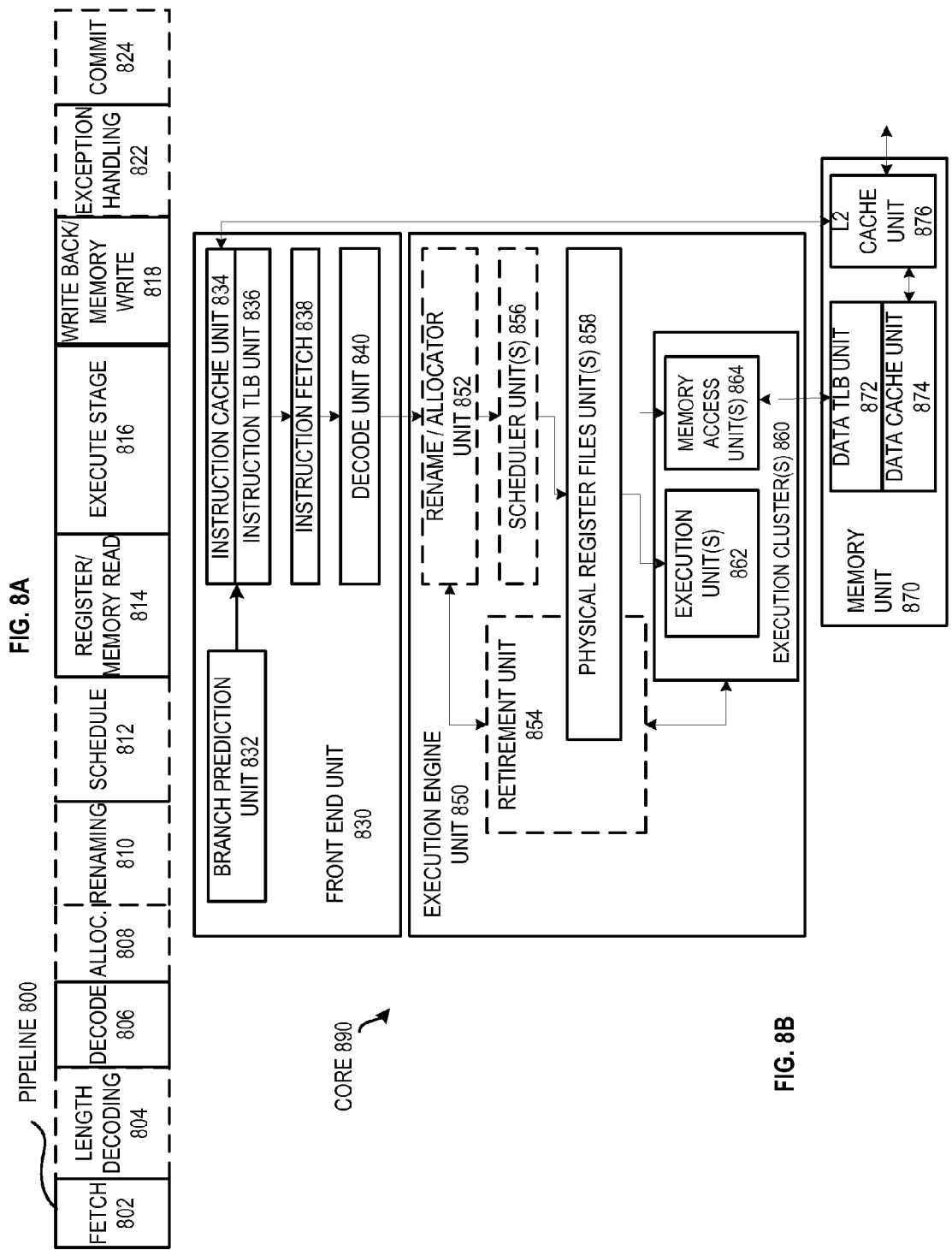

US 10,001,995 B2

PACKED DATA ALIGNMENT PLUS COMPUTE INSTRUCTIONS, PROCESSORS, METHODS, AND SYSTEMS

BACKGROUND

Technical Field

Embodiments described herein generally relate to processors. In particular, embodiments described herein generally relate to processors having Single Instruction, Multiple Data (SIMD) architectures.

Background Information

Many processors have Single Instruction, Multiple Data (SIMD) architectures. In SIMD architectures, multiple data elements may be packed within one register or memory location as packed data or SIMD data. In packed or SIMD data, the bits of the register or memory location may be logically divided into a sequence of data elements. For example, a 128-bit wide packed data register may have two 64-bit data elements, four 32-bit data elements, eight 16-bit data elements, or sixteen 8-bit data elements. A packed data or SIMD instruction may be used to operate on multiple data elements, or multiple pairs of corresponding data elements, of the packed or SIMD data concurrently and in parallel. The processor may have parallel or SIMD execution logic (e.g., one or more SIMD execution units) responsive to the packed data or SIMD instruction to operate on the packed or SIMD data concurrently and in parallel.

BRIEF DESCRIPTION OF THE DRAWINGS

The invention may best be understood by referring to the following description and accompanying drawings that are used to illustrate embodiments. In the drawings:

FIG. 2 is a block flow diagram of an embodiment of a method of performing an embodiment of a packed data alignment plus compute instruction.

FIG. 8A is a block diagram illustrating an embodiment of an in-order pipeline and an embodiment of a register renaming out-of-order issue/execution pipeline.

FIG. 8B is a block diagram of an embodiment of processor core including a front end unit coupled to an execution engine unit and both coupled to a memory unit.

DETAILED DESCRIPTION OF EMBODIMENTS

Figure 1:
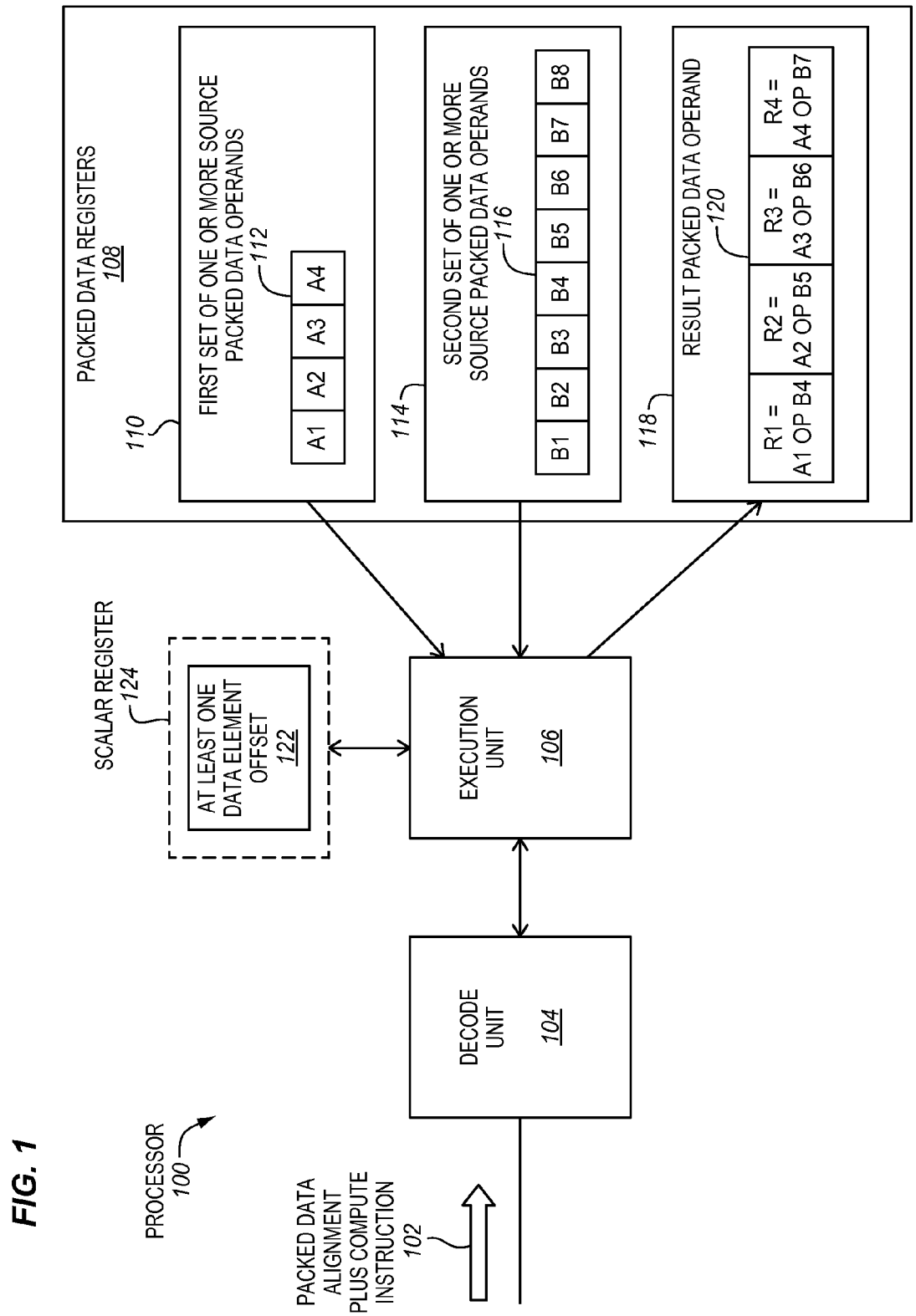
FIG. 1 is a block diagram of an embodiment of a processor that is operative to perform an embodiment of a packed data alignment plus compute instruction.

Disclosed herein are packed data alignment plus compute instructions, processors to execute the instructions, methods performed by the processors when processing or executing the instructions, and systems incorporating one or more processors to process or execute the instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

In some embodiments, the packed data alignment plus compute instructions may be performed in processors with SIMD architectures. In SIMD architectures the parallel or SIMD execution logic (e.g., one or more SIMD execution units) is generally designed to perform operations on data elements of packed or SIMD data that have a particular data element alignment relative to one another. By way of example, a SIMD adder unit may be designed to add corresponding data elements, in same relative data element positions, in first and second source packed data. Similarly, a wide variety of other types of SIMD execution units (e.g., SIMD multiply units, SIMD compare units, SIMD shift units, etc.) may be designed to operate on corresponding data elements, in same relative data element positions, in first and second source packed data. Such operations on corresponding data elements are sometimes referred to as "vertical" SIMD operations.

Other SIMD execution units are not limited to operating on only corresponding data elements and/or to performing only "vertical" SIMD operations. Rather, some SIMD execution units may operate on non-corresponding data elements. As one example, an execution unit to perform a complex multiplication instruction may be operative to multiply both corresponding data elements and non-corresponding data elements (e.g., diagonal data elements), and to combine products of the multiplications. However, the SIMD execution units are typically designed to operate on data elements of source packed data that have a particular fixed and inflexible relative data element alignment. Without the packed data alignment plus compute instructions disclosed herein, if it is desired to operate on data elements that do not already exhibit the particular fixed and inflexible relative data element alignment, then one or more packed data alignment operations typically need to be performed, before the SIMD execution units are able to operate on the desired data elements. For example, an initial shift, rotate, shift-merge, or other packed data alignment instruction may be performed on a first source packed data operand to move or align the data elements of the first source packed data operand, before another instruction is performed to perform an operation on the moved or aligned data elements of the first source packed data operand.

However, the need to perform one or more separate packed data alignment instructions may tend to have one or more drawbacks. One possible drawback is that the one or more packed data alignment instruction(s) are separate instruction(s) that may tend to take additional time to be performed (e.g., one or more clock cycles) and/or may tend to use additional resources (e.g., a fetch unit, a decoder, execution unit, etc.) and thereby increase power consumption. Another possible drawback is that the packed data alignment instruction(s) typically store their results back to architectural register(s) (e.g., packed data registers), which may make the registers unavailable to store other data. Advantageously, the packed data alignment plus compute instructions disclosed herein may combine both a packed data alignment operation, and a compute operation, within the confines of the performance of the same single instruction. This may help to avoid needing to perform separate packed data alignment and compute instructions, and thereby generally help to increase performance, increase the availability of architectural registers, etc.

FIG. 1 is a block diagram of an embodiment of a processor 100 that is operative to perform an embodiment of a packed data alignment plus compute instruction 102. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, digital signal processors (DSPs), image processors, graphics processors, network processors, communications processors, cryptographic processors, co-processors, embedded processors, and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures). In one specific example embodiment, the processor may be a DSP used as an image processor unit, although the scope of the invention is not so limited.

During operation, the processor 100 may receive the packed data alignment plus compute instruction 102. For example, the instruction may be received from memory over a bus or other interconnect. The instruction may represent a macroinstruction, assembly language instruction, machine code instruction, or other instruction or control signal of an instruction set of the processor. In some embodiments, the packed data alignment plus compute instruction may explicitly specify (e.g., through one or more fields or a set of bits), or otherwise indicate (e.g., implicitly indicate), a first set of one or more source packed data operands 112 that is to include a first plurality of data elements (e.g., in the illustrated example labeled as data elements A1 through A4), may explicitly specify or otherwise indicate a second set of one or more source packed data operands that is to include a second plurality of data elements (e.g., in the illustrated example labeled as data elements B1 through B8), and may explicitly specify or otherwise indicate a destination storage location 118 where a result packed data operand 120 is to be stored. As one example, the instruction may have source and/or destination operand specification fields to explicitly specify registers, memory locations, or other storage locations for the operands. Alternatively, one or more of these operands may optionally be implicit or implied by the instruction although not explicitly expressed (e.g., implicit or implied by an opcode of the instruction). For example, the processor may understand based on the opcode that a particular fixed register or other storage location is to be used for one of these operands. In one aspect, the data of the source operands may have been received from an input/output device (e.g., a network interface, a digital image acquisition device, video input device, wireless interface, audio input device, etc.), although this is not required.

As shown, in some embodiments, the packed data alignment plus compute instruction may also explicitly specify or otherwise indicate at least one data element offset 122. As will be explained further below, the at least one data element offset may be used to perform a packed data alignment operation to align the source packed data operands in the first and second sets of source packed data operands. The at least one data element offset may represent various different types of offsets in different embodiments. Examples of suitable offsets include, but are not limited to, a specification or indication of a number of data elements, a specification or indication of a number of bits (e.g., in data element size increments), a selection of one of a predetermined number of data elements, a selection of one of a predetermined number of bits (e.g., in data element size increments), a specified or indicated rotation amount in data elements or bits (e.g., in data element size increments), and a specified or indicated shift amount in data elements or bits (e.g., in data element size increments), to name just a few examples. As shown, in some embodiments, the at least one data element offset may optionally be stored in a general-purpose register or other scalar register 124. Alternatively, an immediate of the instruction may optionally be used to provide the at least one data element offset, or a combination of such approaches may optionally be used. Advantageously, such embodiments, allow the instruction to indicate a flexible or variable offset (e.g., in one aspect the offset may be any one of −4, −3, −2, −1, 0, 1, 2, 3, or 4 data elements offset positions, where the negative integers (e.g., −2) are used to indicate an offset in one direction and the non-negative inters (e.g., 2) are used to indicate an offset in the opposite direction). In still other embodiments, a fixed offset may optionally be implicit to the instruction (e.g., an opcode thereof), rather than being flexibly or variably indicated through a non-opcode field of the instruction.

Referring again to FIG. 1, the processor includes a decode unit or decoder 104. The decode unit may receive and decode the packed data alignment plus compute instruction. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level packed data alignment plus compute instruction. In some embodiments, the decode unit may include one or more input structures (e.g., port(s), interconnect(s), an interface) to receive the packed data alignment plus compute instruction, an instruction recognition and decode logic coupled therewith to recognize and decode the packed data alignment plus compute instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units.

In some embodiments, instead of the packed data alignment plus compute instruction being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the packed data alignment plus compute instruction, which may be of a first instruction set, and may emulate, translate, morph, interpret, or otherwise convert the packed data alignment plus compute instruction into one or more corresponding intermediate instructions or control signals, which may be of a second different instruction set. The one or more intermediate instructions or control signals of the second instruction set may be provided to a decode unit (e.g., decode unit 104), which may decode them into one or more lower-level instructions or control signals executable by native hardware of the processor (e.g., one or more execution units).

Referring again to FIG. 1, the processor 100 also includes a set of packed data registers 108. Each of the packed data registers may represent an on-die storage location that is operative to store packed data or SIMD data. The packed or SIMD data may exhibit "spatial" SIMD in which the elements may be received together over a bus or other interconnect, stored together in the register as packed or SIMD data in which there may be breaks in the carry chain between data elements, etc. The packed data registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The packed data registers may be implemented in different ways in different microarchitectures and are not limited to any particular type of design. Examples of suitable types of registers include, but are not limited to, dedicated physical registers, dynamically allocated physical registers using register renaming, and combinations thereof.

In some embodiments, the first set of one or more source packed data operands 112 may optionally be stored in a first set of one or more packed data registers 110 (e.g., a single register may be used to store a single operand or a different packed data register may be used to store each of two different operands), and the second set of one or more source packed data operands 116 may optionally be stored in a second set of one or more packed data registers 114 (e.g., a single register may be used to store a single operand or a different packed data register may be used to store each of two different operands). In some embodiments, the destination storage location 118 may optionally be a third packed data register. Alternatively, memory locations, or other storage locations, may optionally be used for one or more of these operands. Moreover, in some embodiments, a source/destination packed data register used for one of the source packed data operands may optionally be reused as the destination storage location for storage of the result packed data operand. For example, the instruction may specify the source/destination register and the processor may implicitly or impliedly understand that the source/destination register is initially to be used to retrieve the source operand and then subsequently the result operand is to be stored in the source/destination register overwriting the source operand. In addition, in some embodiments the instruction may indicate only one set of one or more source packed data operands (e.g., the set 112 but not the set 116).

Referring again to FIG. 1, the execution unit 106 is coupled with the decode unit 104. The execution unit may receive the one or more decoded or otherwise converted instructions or control signals that represent and/or are derived from the packed data alignment plus compute instruction. The execution unit is also coupled with the first and second sets of source packed data operands 112, 116, for example, by being coupled with the packed data registers 108. The execution unit may receive the first and second sets of source packed data operands. The execution unit is operative in response to and/or as a result of the packed data alignment plus compute instruction (e.g., in response to one or more instructions or control signals decoded therefrom) to store the result packed data operand 120 in the destination storage location 118 indicated by the instruction.

In some embodiments, the result packed data operand may include a plurality of result data elements (e.g., in the illustrated example labeled as data elements R1 through R4). In some embodiments, each of the result data elements may have a value of an operation performed with a pair of a data element in the first set of source packed data operands 112 and a data element in the second set of source packed data operands 116. For example, as shown in the illustrated example embodiment, R1 may have a value of an operation (OP) performed with a pair of a data element A1 in the first set of source packed data operands and a non-corresponding data element B4 in the second set of source packed data operands. Likewise, R2 may have a value of the operation (OP) performed with A2 and B5, R3 may have a value of the operation (OP) performed with A3 and B6, and R4 may have a value of the operation (OP) performed with A4 and B7. This is only one illustrative example for an example offset of three data element positions applied to the operand(s) 116.

In some embodiments, for example when the at least one data element offset collectively or cumulatively amounts to least one non-zero data element offset, the data elements in each pair may be non-corresponding data elements in the source operands. For example, A1 and B4 are in non-corresponding data element positions in the first and second sets of source packed data operands (i.e., A1 is in a corresponding data element position with B1 but not with B4 in the first and second sets of source packed data operands) Likewise, A2 and B5, A3 and B6, and A4 and B7, are each in non-corresponding data element positions in the first and second sets of source packed data operands.

The execution unit may apply the at least one data element offset to at least a corresponding one of the first and second sets of source packed data operands, and the at least one data element offset may negate, eliminate, cancel, or otherwise counteract any lack of correspondence between the data elements of each pair in the first and second sets of source packed data operands. Application of the at least one data element offset to at least one of the first and second sets of source packed data operands may bring the data elements of each pair into correspondence (e.g., same relative data element positions) or align them in intermediate or microarchitectural registers or circuitry within the execution unit. In some embodiments, the non-corresponding data element positions may differ based on the at least one data element offset indicated by the packed data alignment plus compute instruction. In the case of a single non-zero offset, the non-corresponding data elements may differ by the non-zero offset. For example, in the illustrated example embodiment, the non-corresponding data element positions differ by three data element positions. For example, B4 may be rotated, shifted, or otherwise moved or offset three data element positions to the left in the illustration (which may either be toward a least or most significant bit position depending on the implementation) so that it would be in a corresponding data element position with A1. In some embodiments, this three data element position difference (in this particular example) may be equal to a single data element offset of three data element positions. In other embodiments, in the case of two offsets, the non-corresponding data elements may differ by or based on the combination of the two offsets or the application of the two offsets. For example, the illustrated three data element position difference (in this particular example) may be equal to a difference between a first data element offset that is to be applied to the first set of one or more source packed data operands, and a second data element offset that is to be applied to the second set of one or more source packed data operands. By way of example, in the illustration, A1 is not shown as having been moved, which could be performed with a zero data element offset to be applied to the first set of packed data operands, and a three data element offset to be applied to the second set of packed data operands. In other embodiments, the non-corresponding data element positions may differ based on other differences between positive or negative data element offsets, such as, for example a difference between negative four and four data element positions (i.e., −4, −3, −2, −1, 0, 1, 2, 3, 4), a difference between negative two and two data element positions (e.g., −2, −1, 0, 1, 2), a difference between zero and four data element positions (i.e., 0, 1, 2, 3, 4), a difference between zero and two data element positions (i.e., 0, 1, 2), a difference between zero and one data element positions, a difference between negative six and six data element positions, a difference between zero and six data element positions, etc.

In the illustrated embodiment, a particular example of source and result operands has been shown and described, although the scope of the invention is not so limited. In the illustrated example embodiment, the first set of source packed data operands optionally has at least four data elements, the second set of source packed data operands optionally has eight data elements, and the result packed data operand optionally has four data elements, although in other embodiments either fewer or more data elements may optionally be used for these operands. As one other illustrative example, each of the first and second sets of source packed data operands may optionally have sixty four data elements, and the result packed data operand may optionally have half as many or thirty two data elements. In other embodiments, other numbers of data elements disclosed herein are also suitable. Also, to facilitate illustration, the result data elements are physically larger than the source data elements, although the result data elements may either have the same or a different number of bits than the source data elements. Moreover, the data elements of the first and second sets of source packed data operands may either have the same or a different number of bits. In some embodiments, the result packed data operand may be any of those shown and described for any of FIGS. 3-6, including the variations and alternative embodiments thereof.

The execution unit and/or the processor may include specific or particular logic (e.g., transistors, integrated circuitry, or other hardware potentially combined with firmware (e.g., instructions stored in non-volatile memory) and/or software) that is operative to perform the packed data alignment plus compute instruction and/or store the result in response to and/or as a result of the packed data alignment plus compute instruction (e.g., in response to one or more instructions or control signals decoded from the packed data alignment plus compute instruction). In some embodiments, the execution unit may include one or more input structures (e.g., port(s), interconnect(s), an interface) to receive source operands, packed data alignment circuitry or logic (e.g., shift or rotate circuitry or logic) to perform an arithmetic operation on the source operands, arithmetic or logical operation circuitry or logic coupled therewith to perform an arithmetic or logical operation on the aligned intermediate operands and generate the result operand, and one or more output structures (e.g., port(s), interconnect(s), an interface) coupled therewith to output the result operand. In some embodiments, the execution unit may include the circuitry or logic shown and described for FIG. 4, or the variations or alternatives thereof, which are illustrative examples of suitable micro-architectural arrangements, although the scope of the invention is not so limited. In some embodiments, the execution unit may be included in an image processor unit of a digital signal processor and used to process pixels of images, although the scope of the invention is not so limited.

To avoid obscuring the description, a relatively simple processor 100 has been shown and described. However, the processor may optionally include other processor components. For example, various different embodiments may include various different combinations and configurations of the components shown and described for FIG. 7 and/or any of FIGS. 8-10. All of the components of the processor may be coupled together to allow them to operate as intended.

FIG. 2 is a block flow diagram of an embodiment of a method 230 of performing an embodiment of a packed data alignment plus compute instruction. In various embodiments, the method may be performed by a processor, instruction processing apparatus, or other digital logic device. In some embodiments, the method of FIG. 2 may be performed by and/or within the processor of FIG. 1. The components, features, and specific optional details described herein for the processor of FIG. 1, also optionally apply to the method of FIG. 2. Alternatively, the method of FIG. 2 may be performed by and/or within a different processor or apparatus. Moreover, the processor of FIG. 1 may perform methods different than those of FIG. 2.

The method includes receiving the packed data alignment plus compute instruction, at block 231. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). The packed data alignment plus compute instruction may specify or otherwise indicate a first set of one or more source packed data operands that include a first plurality of data elements, may specify or otherwise indicate a second set of one or more source packed data operands that include a second plurality of data elements, may specify or otherwise indicate at least one data element offset, and may specify or otherwise indicate a destination storage location.

A result packed data operand may be stored in the destination storage location, in response to and/or as a result of the packed data alignment plus compute instruction, at block 232. The result packed data operand may include a plurality of result data elements. In some embodiments, each of the result data elements may have a value of an operation performed with a pair of a data element in the first set of source packed data operands and a non-corresponding data element in the second set of source packed data operands. In some embodiments, the non-corresponding data elements of each pair were in non-corresponding data element positions in the first and second sets of source packed data operands. In some embodiments, the non-corresponding data element positions differed based on the at least one data element offset indicated by the packed data alignment plus compute instruction. In some embodiments, the method may be performed during pixel filtering during image processing with a digital signal processor, although the scope of the invention is not so limited.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction (e.g., shifting, rotating, or otherwise moving data elements based on the at least one offset), etc.

Figure 3:
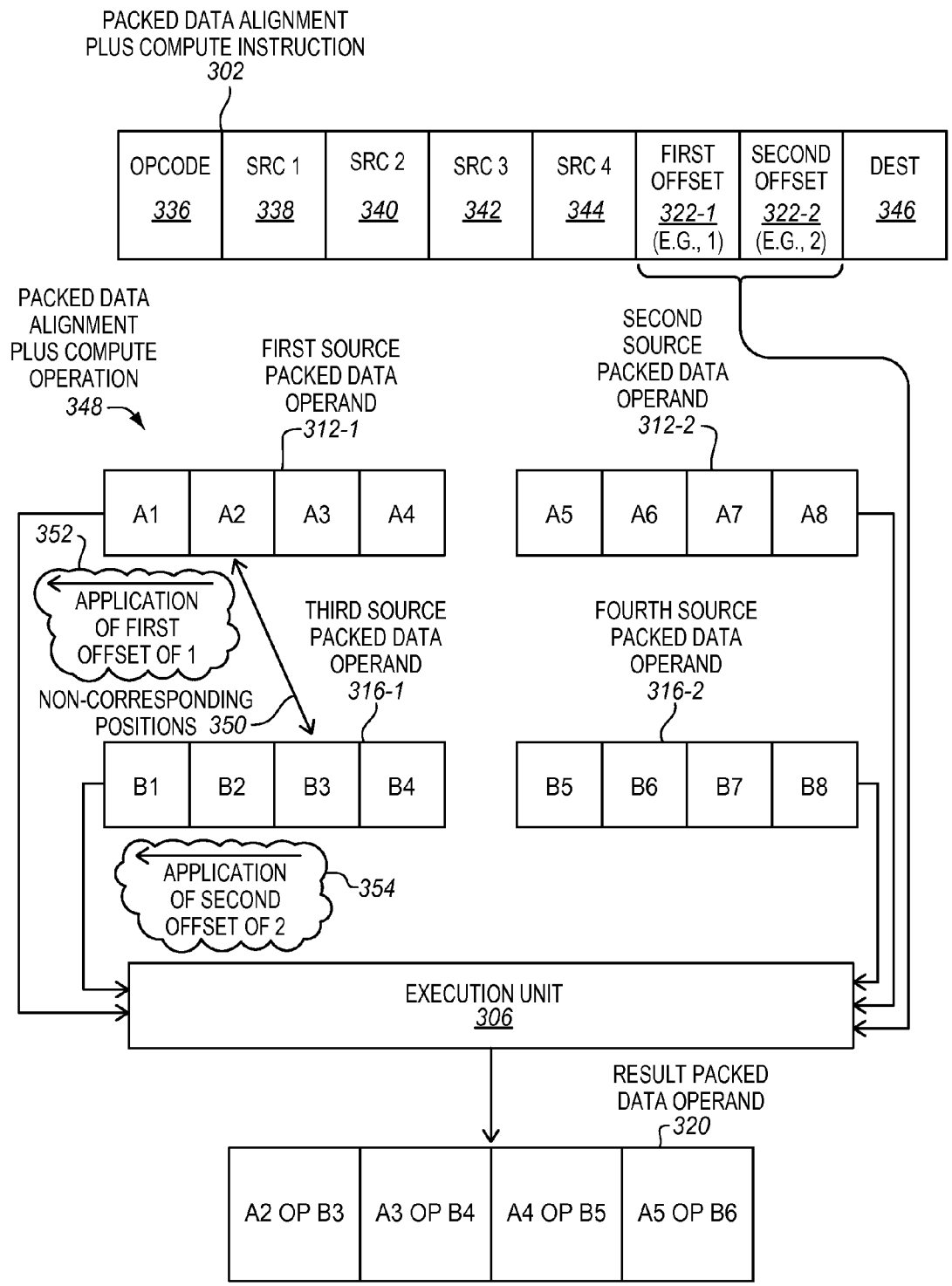
FIG. 3 is a block diagram illustrating a first embodiment of a packed data alignment plus compute operation.

FIG. 3 is a block diagram illustrating a first example embodiment of a packed data alignment plus compute operation 348 that may be performed in response to a first example embodiment of a packed data alignment plus compute instruction 302. The instruction includes an operation code or opcode 336. The opcode may represent a plurality of bits or one or more fields that are operable to identify the instruction and/or the operation to be performed (e.g., a packed data alignment and specific type of compute operation (e.g., average, multiply, add, shift, etc.)).

The instruction also optionally includes a first source specification field (SRC1) 338 to specify a first source packed data operand 312-1, and a second source specification field (SRC2) 340 to specify a second source packed data operand 312-2. The first and second source packed data operands represent a first set of source packed data operands. The instruction also optionally includes a third source specification field (SRC3) 342 to specify a third source packed data operand 316-1, a fourth source specification field (SRC4) 344 to specify a fourth source packed data operand 316-2. The third and fourth source packed data operands represent a second set of source packed data operands. The instruction also optionally includes a destination specification field (DEST) 346 to specify a destination storage location where a result packed data operand 320 is to be stored.

By way of example, each of the source and destination specification fields may include bits (often but not necessarily contiguous) to explicitly specify an address of a register, memory location, or other storage location, which is to store the associated operand. Alternatively, in another embodiment, any of the specification fields may optionally be omitted, and the register or other storage location may optionally be implicit to or implied by the instruction. For example, upon decoding the opcode, it may be inherent or understood (though not explicitly expressed) to use a fixed register for one of the operands. As another example, instead of having the destination specification field, one of the source specification fields may represent a source/destination specification field to specify a source/destination register. A source packed data operand may initially be stored in the source/destination register, and then it may be implicit or inherent to reuse the source/destination register to store the result packed data operand over the initial source packed data operand.

The instruction also indicates at least one data element offset. In the illustrated example embodiment, the instruction has a first offset specification field 322-1 to specify or otherwise indicate a first offset that is to correspond to, and is to be applied to, the first set of source packed data operands (in this embodiment operands 312-1, 312-2), and an optional second offset specification field 322-2 to specify or otherwise indicate an optional second offset that is to correspond to, and is to be applied to, the second set of source packed data operands (in this embodiment operands 316-1, 316-2). In some embodiments, the bits of each of these offset specification fields may specify or otherwise indicate a register (e.g., a general-purpose register or other scalar register) or other storage location where the values of the offsets are stored. In other embodiments, the bits of each of these offset specification fields may specify the value of the offset, or otherwise encode or indicate the value of the offset (e.g., have a value to select between multiple predetermined offsets). In some embodiments, an immediate of the instruction may optionally have the first and optional second offsets. A combination of approaches is also suitable.

In the illustrated example embodiment, the first offset indicates an offset of one data element position, and the second offset indicates an offset of two data element positions, although this is just one illustrative example. In other embodiments, each of the first and second offsets may be any of −8, −7, −6, −5, −4, −3, −2, −1, 0, 1, 2, 3, 4, 5, 7, or 8 data element positions. Either fewer or more data element offsets may optionally be supported in other embodiments. In other embodiments, the instruction may have only a single offset specification field to provide a single offset. In addition, in other embodiments one or more offsets may optionally be implicit or inherent to the instruction (e.g., an opcode) and be inflexible or fixed. Other embodiments of packed data alignment plus compute instructions may optionally omit some of the described fields, add additional fields (e.g., add fields associated with the particular type of operation (e.g., to provide a shift amount, indicate if saturation is to be performed, etc.)), and may rearrange the fields variously within the instruction.

In the illustration, an example of a suitable set of source operands is shown, although the scope of the invention is not limited to these particular source operands. Specifically, the first source packed data operand 312-1 (e.g., indicated by SRC1) has four packed data elements A1-A4, the second source packed data operand 312-2 (e.g., indicated by SRC2) has four packed data elements A5-A8. Similarly, the third source packed data operand 316-1 (e.g., indicated by SRC3) has four packed data elements B1-B4, and the fourth source packed data operand 316-2 (e.g., indicated by SRC4) has four packed data elements B5-B8. In other embodiments, the source packed data operands may optionally include a different number of packed data elements. Commonly, the number of data elements in each source packed data operand may be equal to the size in bits of the source packed data operand divided by the size in bits of a single data element. In various embodiments, each source packed data operand may be 64-bits, 128-bits, 256-bits, 512-bits, or 1024-bits, although the scope of the invention is not so limited. In various embodiments, each data element may be 8-bits, 16-bits, 32-bits, or 64-bits, although the scope of the invention is not so limited. In various embodiments, there may be four, eight, sixteen, thirty two, or sixty four data elements in each of the operands, although the scope of the invention is not so limited. It is not required that the operands have the same number of data elements. Commonly, the number of data elements in an operand is a power-of-two number, although this is not required.

In the illustrated example embodiment, the least significant data elements are on the left, and the most significant data elements are on the right, although the opposite arrangement is also possible. Data elements in the same relative data element positions in the first set of operands 312-1, 312-2 and in the second set of operands 316-1, 316-2 are in corresponding positions and/or are corresponding data elements. For example, A1 and B1 are corresponding data elements, A2 and B2 are corresponding data elements, and so on. In contrast, A2 and B3 are in non-corresponding data element positions and/or A2 and B3 are non-corresponding data elements. Moreover, the first and second source packed data operands may be logically concatenated or otherwise considered together such that A5 and B5 correspond but A5 and B1 do not correspond, so that A7 and B7 correspond but A7 and B3 do not correspond, and so on.

The packed data alignment plus compute operation 348 may be performed in response to the embodiment of the packed data alignment plus compute instruction 302. This may include retrieving or otherwise receiving the source operands from their associated registers or other storage locations, and providing them to an execution unit 306. The at least one offset indicated by the instruction (in this embodiment the first offset and the optional second offset), may also be provided to the execution unit. The execution unit, responsive to the packed data alignment plus compute instruction, may be operative to generate and store a result packed data operand 320 in the destination storage location (e.g., indicated by DEST). The result packed data operand may include a plurality of result data elements. In the illustrated example embodiment the result packed data operand has four result data elements, although other embodiments may have fewer or more than four result data elements. In some embodiments, each of the result data elements may have a value of an operation (OP) performed with at least a pair of a data element in the first set of source packed data operands (e.g., operands 312-1, 312-2), and a non-corresponding data element in the second set of source packed data operands (e.g., operands 316-1, 316-2), in which the non-corresponding data elements of each pair are in non-corresponding data element positions in the first and second sets of source packed data operands. For example, in the illustrated example embodiment, a first result data element may have a value of the operation (OP) performed on A2 and B3, a second result data element may have a value of the operation (OP) performed on A3 and B4, a third result data element may have a value of the operation (OP) performed on A4 and B5, and a fourth result data element may have a value of the operation (OP) performed on A5 and B6.

In some embodiments, the non-corresponding data elements of each pair may be in non-corresponding data element positions in the first and second sets of source packed data operands, which differ based on the at least one data element offset (e.g., the first offset 322-1 and the second offset 322-2) indicated by the instruction. The non-corresponding data element positions may be such that the execution unit is operative to apply the first and second offsets to the source operands, responsive to the packed data alignment plus compute instruction, and within the confines of performance of the packed data alignment plus compute instruction, to bring the non-corresponding data elements into corresponding data element positions. For example, B3 may be offset or otherwise moved into a corresponding data element position relative to A2 (e.g., into same relative data element bit positions) by application of the first offset 322-1 of one data element position to the first and second source packed data operands (e.g., a logical concatenation thereof), and by application of the second offset 322-2 of two data element positions to the third and fourth source packed data operands (e.g., a logical concatenation thereof). In the illustrated example embodiment, the first offset is one data element position, and the second offset is two data element positions, so applying the first and second offsets collectively offsets or moves the relative positions of the data elements by one data element position. Collectively the two offsets are operative to make A2 and B3 corresponding data elements, A3 and B4 corresponding data elements, A5 and B6 corresponding data elements, and so on, within the execution unit. The data element offsets may be applied in different ways in different embodiments, such as, for example, as shifts, as rotates, as shift-merge operations, etc. Note that A2 and B3 (and the like) will not generally be corresponding data elements within the architecturally visible packed data registers, but rather once accessed from the packed data registers will be brought into corresponding data elements within internal circuitry and/or a temporary/intermediate non-architecturally visible register within the internals of the execution unit.

The execution unit may be operative to perform any of a wide variety of different types of operations (OP) on the aligned data elements. The scope of the invention is not limited to any known particular type of such operation (OP). Examples of suitable types of operations include, but are not limited to, arithmetic operations (e.g., addition, subtraction, multiplication, division, multiply-add, multiply-accumulate, dot product, etc.), logical operations (e.g., shift, rotate, logical AND, logical OR, logical XOR, logical AND NOT, etc.), other operations (e.g., compare operations, square root, reciprocal square root, bit count, bit reverse, saturate to half width, etc.), and combinations thereof. In some embodiments, the execution unit may perform "vertical" SIMD compute operations (e.g., with "vertical" SIMD lanes or portions of the execution unit) on only corresponding data elements, which are in same relative data element positions, although the scope of the invention is not so limited. For example, the execution unit may perform a packed add, a packed subtract, a packed multiply, a packed divide, a packed average, a packed saturate to half width, a packed square root, a packed reciprocal square root, a packed shift, a packed rotate, a packed logical AND, a packed logical OR, a packed logical XOR, a packed logical AND NOT, a packed compare, or the like, on only corresponding data elements in the first and second sets of source operands.

In some embodiments, the execution unit may perform a combination of both vertical and non-vertical SIMD compute operations involving a combination of corresponding data elements and non-corresponding data elements. As one example, the execution unit may perform a complex multiply operation involving adding both products of corresponding and non-corresponding data elements. Various other examples of such more elaborate vertical plus non-vertical SIMD operations are also suitable. In any event, the data elements have been aligned into the intended positions that the execution unit expects or was designed for them to be in in order to perform the operations on the desired sets of data elements. Advantageously, the alignment operation may allow reuse or leveraging of a wide variety of different types of existing vertical and/or vertical and non-vertical SIMD execution units or logic and without needing to perform separate packed data alignment instructions (e.g., shift merge instructions) to achieve the same packed data alignment. In particular example embodiments, the operation may be one of multiply, add, average, and multiply accumulate, although the scope of the invention is not so limited.

Figure 4:
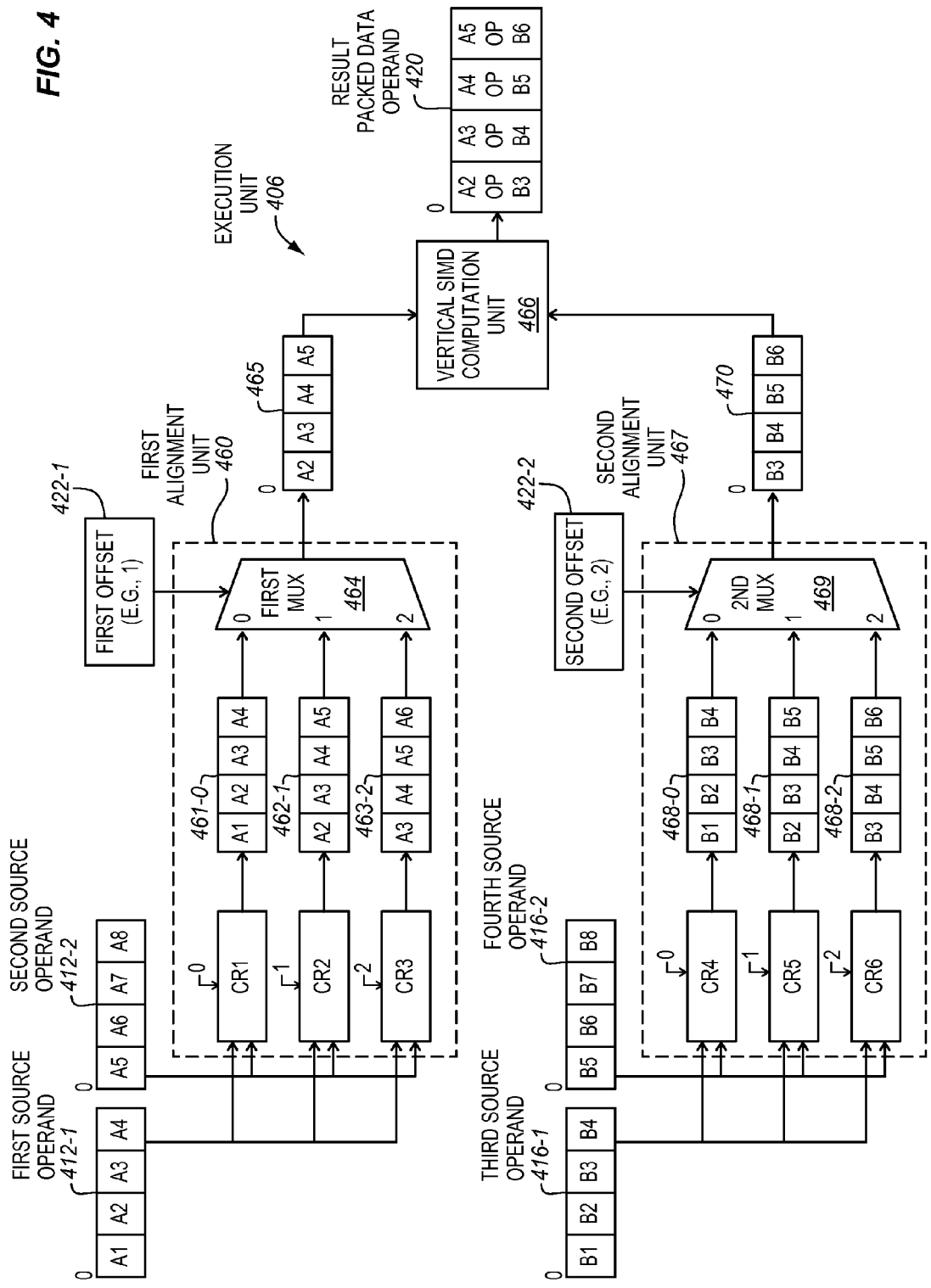
FIG. 4 is a block diagram of an example embodiment of an execution unit that is operative to perform an embodiment of a packed data alignment plus compute operation.

FIG. 4 is a block diagram of an example embodiment of an execution unit that is operative to perform an embodiment of a packed data alignment plus compute operation. The execution unit may be used to perform different operations described herein (e.g., those of FIGS. 3 and 5-6). The execution unit includes a first alignment unit 460 and a second alignment unit 467. The execution unit also includes a vertical SIMD computation unit 466.

The first alignment unit is coupled to receive a first set of one or more source packed data operands, which in the illustrated embodiment include a first source packed data operand 412-1 and a second source packed data operand 412-2. The first alignment unit includes a first concatenate and rotate unit CR1, a second concatenate and rotate unit CR2, and a third concatenate and rotate unit CR3. CR1 is operative to perform a right rotate (although shown to the left in the illustration) toward the least significant bit position of zero data element positions and to output a zero data element offset intermediate operand 461-0. Since the rotation is by zero data element positions the CR1 unit may optionally be replaced by a simpler concatenate unit. CR2 is operative to perform a right rotate toward the least significant bit position of one data element position and to output a one data element offset intermediate operand 461-1. CR2 is operative to perform a right rotate toward the least significant bit position of two data element position and to output a two data element offset intermediate operand 461-2. Each of the intermediate operands 461 may be provided as inputs to a first multiplexer (MUX) or other selector unit 464. In other embodiments additional and/or different numbers of data element positions may optionally be supported. For example, in one alternate embodiment, five or nine different data element offset intermediate operands may optionally be generated and input to the selector unit. Also, in other embodiments, shifts instead of rotates may optionally be used. A first data element offset 422-1 indicated by the instruction may be input to the selector unit 464 and may be used to select one of the inputs. In this example embodiment, the first data element offset is one data element position, so the one data element offset intermediate operand 461-1 may be selected and output as a first selected operand 465.

The second alignment unit 467 is coupled to receive a second set of one or more source packed data operands, which in the illustrated embodiment include a third source packed data operand 416-1 and a fourth source packed data operand 416-2. The second alignment unit includes a fourth concatenate and rotate unit CR4, a fifth concatenate and rotate unit CR5, and a sixth concatenate and rotate unit CR6. CR4 is operative to perform a right rotate (although shown to the left in the illustration) toward the least significant bit position of zero data element positions and to output a zero data element offset intermediate operand 468-0. Since the rotation is by zero data element positions the CR4 unit may optionally be replaced by a simpler concatenate unit. CR5 is operative to perform a right rotate toward the least significant bit position of one data element position and to output a one data element offset intermediate operand 468-1. CR6 is operative to perform a right rotate toward the least significant bit position of two data element position and to output a two data element offset intermediate operand 468-2. Each of the intermediate operands 468 may be provided as inputs to a second multiplexer (MUX) or other selector unit 469. In other embodiments additional and/or different numbers of data element positions may optionally be supported. For example, in one alternate embodiment, five or nine different data element offset intermediate operands may optionally be generated and input to the selector unit. Also, in other embodiments, shifts instead of rotates may optionally be used. A second data element offset 422-2 indicated by the instruction may be input to the second selector unit 469 and may be used to select one of the inputs. In this example embodiment, the second data element offset is two data element positions, so the two data element offset intermediate operand 461-2 may be selected and output as a second selected operand 470.

Both the first selected operand 465 and the second selected operand 470 may be input to the vertical SIMD computation unit 466 (e.g., a SIMD add unit, a SIMD multiply unit, etc.). The vertical SIMD computation unit may be operative to perform vertical SIMD computation operations on corresponding data elements of the first and second selected operands. Any of the previously described types of operations are suitable, such as, for example, packed add, multiply, average, divide, or other operations described herein. The vertical SIMD computation unit may output and store a result packed data operand 420. In the illustrated example embodiment, since the first offset is one data element position, and the second offset is two data element positions, the result packed data operand may have a first result data element with a value of an operation performed on A2 and B3, a second result data element with a value of an operation performed on A3 and B4, a third result data element with a value of an operation performed on A4 and B5, and a fourth result data element with a value of an operation performed on A5 and B6.

This is just one illustrative example of a suitable execution unit. In other embodiments, the first and second alignment units may instead perform shift-merge type operations based on the corresponding offset instead of multiple shift operations and a select operation. In still other embodiments, a single variable shift or rotate unit may shift or rotate the operands based on the offset instead of creating multiple possibilities and selecting one of them. Moreover, in other embodiments, only one of the first and second alignment units may optionally be included if only a single data element offset is to be used.

Figure 5:
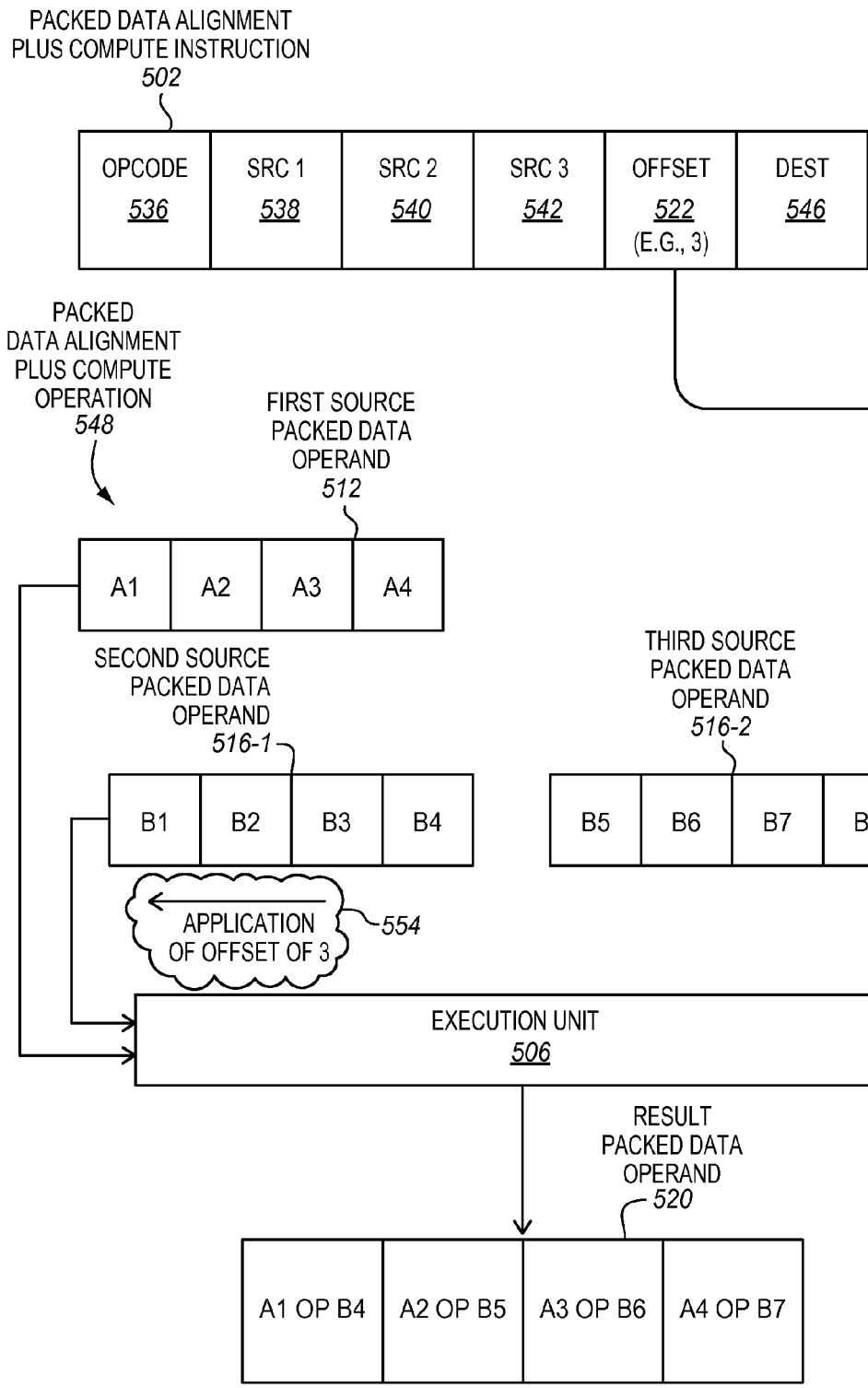
FIG. 5 is a block diagram illustrating a second embodiment of a packed data alignment plus compute operation.

FIG. 5 is a block diagram illustrating a second example embodiment of a packed data alignment plus compute operation 548 that may be performed in response to a second example embodiment of a packed data alignment plus compute instruction 502. The instruction and operation of FIG. 5 have certain similarities to the instruction and operation of FIG. 3. To avoid obscuring the description, the different and/or additional characteristics for the instruction and operation of FIG. 5 will primarily be described, without repeating all the optionally similar or common characteristics, details, variations, and alternatives relative to the instruction and operation of FIG. 3. However, it is to be appreciated that the previously described characteristics, details, variations, and alternatives of the instruction and operation of FIG. 3 may also optionally apply to the instruction and operation of FIG. 5, unless otherwise stated or clearly apparent.

The instruction 502 includes an opcode 536, a first source specification field (SRC1) 538 to specify a first source packed data operand 512, a second source specification field (SRC2) 540 to specify a second source packed data operand 516-1, and a third source specification field (SRC3) 542 to specify a third source packed data operand 516-2. In this embodiment, the first source packed data operand 512 is a first set of only a single source packed data operand, in contrast to the two source packed data operands in the embodiment of FIG. 3. The second and third source packed data operands 516 represent a second set of two source packed data operands. The instruction also optionally includes a destination specification field (DEST) 546 to specify a destination storage location where a result packed data operand 520 is to be stored. Each of these fields and operands may have the characteristics, details, variations, and alternatives previously described.

In this embodiment, the instruction also only indicates a single data element offset in contrast to the two data element offsets in the embodiment of FIG. 3. The instruction has a single offset specification field 522 to specify or otherwise indicate a single offset that is to correspond to, and is to be applied to, the second set of source packed data operands (in this embodiment operands 516-1, 516-2). The data element offset and its specification field may have the characteristics, details, variations, and alternatives previously described. There are various situations in which it is useful to perform only a relative offset between the second and third source packed data operands and the first source packed data operand, without offsetting or moving the data elements of the first source packed data operand. The single data element offset is sufficient to achieve this. Also, only applying a single data element offset may help to reduce the complexity of the execution unit, such as, for example, by eliminating one of the alignment units (e.g., eliminating the first alignment unit in FIG. 4). In the illustrated example embodiment, the single offset indicates an offset of three data element positions, although this is just one illustrative example. In other embodiments, the single offset may be any one of −4 to 4, 0 to 4, −2 to 2, 0 to 2, or some other number of data element positions, depending upon the particular implementation. As before, the offset may be specified as a number of data elements, a number of bits, a shift amount, a rotation amount, or the like. Alternatively, in other embodiments, a second data element offset may optionally be used, if desired. In an alternate embodiment, a fixed offset may optionally be used instead of the offset specification field, and may be implicit to the opcode, as previously described.

In the illustrated embodiment, the first set of one or more source packed data operands has only the single first source packed data operand 512 (e.g., indicated by SRC1), which in this example embodiment has four packed data elements A1-A4. The second source packed data operand 516-1 (e.g., indicated by SRC2) has four packed data elements B1-B4, and the third source packed data operand 516-2 (e.g., indicated by SRC3) has four packed data elements B5-B8. Since only the second and third source packed data elements are to be offset in the illustrated example embodiment, there is no need for additional data elements to replace or substitute for lost data elements due to offsetting the first source packed data operand as was shown by data element A5 in FIG. 3. Other numbers of data elements may instead be used as previously described. In addition, in the illustrated embodiment the second set of source packed data operands has the second and third source packed data operand, although in another embodiment a single source packed data operand with more data elements than the first source packed data operand (e.g., twice as many or at least one more depending upon the amount of offset supported) may optionally be used instead.

Data elements in same relative data element positions in the first source packed data operand 512 and in the second set of the second and third source packed data operands 516-1, 516-2 are in corresponding positions and/or are corresponding data elements. For example, A1 and B1 correspond, A4 and B4 correspond, and so on. In contrast, A1 and B4 are in non-corresponding data element positions and/or A1 and B4 are non-corresponding data elements in the source operands. Moreover, the first and second source packed data operands may be logically concatenated or otherwise considered together such that A1 and B5 do not correspond.

The second embodiment of the packed data alignment plus compute operation 548 may be performed in response to the second embodiment of the packed data alignment plus compute instruction 502. The execution unit, responsive to the packed data alignment plus compute instruction, may be operative to generate and store a result packed data operand 520 in the destination storage location. In the illustrated example embodiment the result packed data operand has four result data elements, although other embodiments may have fewer or more than four result data elements. In some embodiments, each of the result data elements may have a value of an operation (OP) performed with at least a pair of a data element in the first set of source packed data operands (e.g., single source packed data operand 512), and a non-corresponding data element in the second set of source packed data operands (e.g., the second and third source packed data operands 516-1, 516-2). The non-corresponding data elements of each pair may be in non-corresponding data element positions in the first source packed data operand and in the second and third packed data operands. For example, in the illustrated example embodiment, a first result data element may have a value of the operation (OP) performed on A1 and B4, a second result data element may have a value of the operation (OP) performed on A2 and B5, a third result data element may have a value of the operation (OP) performed on A3 and B6, and a fourth result data element may have a value of the operation (OP) performed on A4 and B7. This is just one illustrative example.

As before, in some embodiments, the non-corresponding data elements of each pair may be in non-corresponding data element positions in the source packed data operands, which differ based on the single data element offset. The non-corresponding data element positions may be such that the execution unit is operative to apply the single data element offset to the second and third source packed data operands, responsive to the packed data alignment plus compute instruction, and within the confines of performance of the packed data alignment plus compute instruction, to bring the non-corresponding data elements into corresponding data element positions. For example, B4 may be offset or otherwise moved by three data element positions so that it corresponds to A1 (e.g., has a same relative data element position) by application of the single data element offset 522 to the second and third source packed data operands (e.g., a logical concatenation thereof). The execution unit may be operative to perform any of the various different types of operations (OP) on the aligned data elements as previously described. In some embodiments, the execution unit may perform "vertical" SIMD compute operations on only corresponding data elements. In other embodiments, the execution unit may perform a combination of both vertical and non-vertical SIMD compute operations involving a combination of corresponding data elements and non-corresponding data elements.

Figure 6:
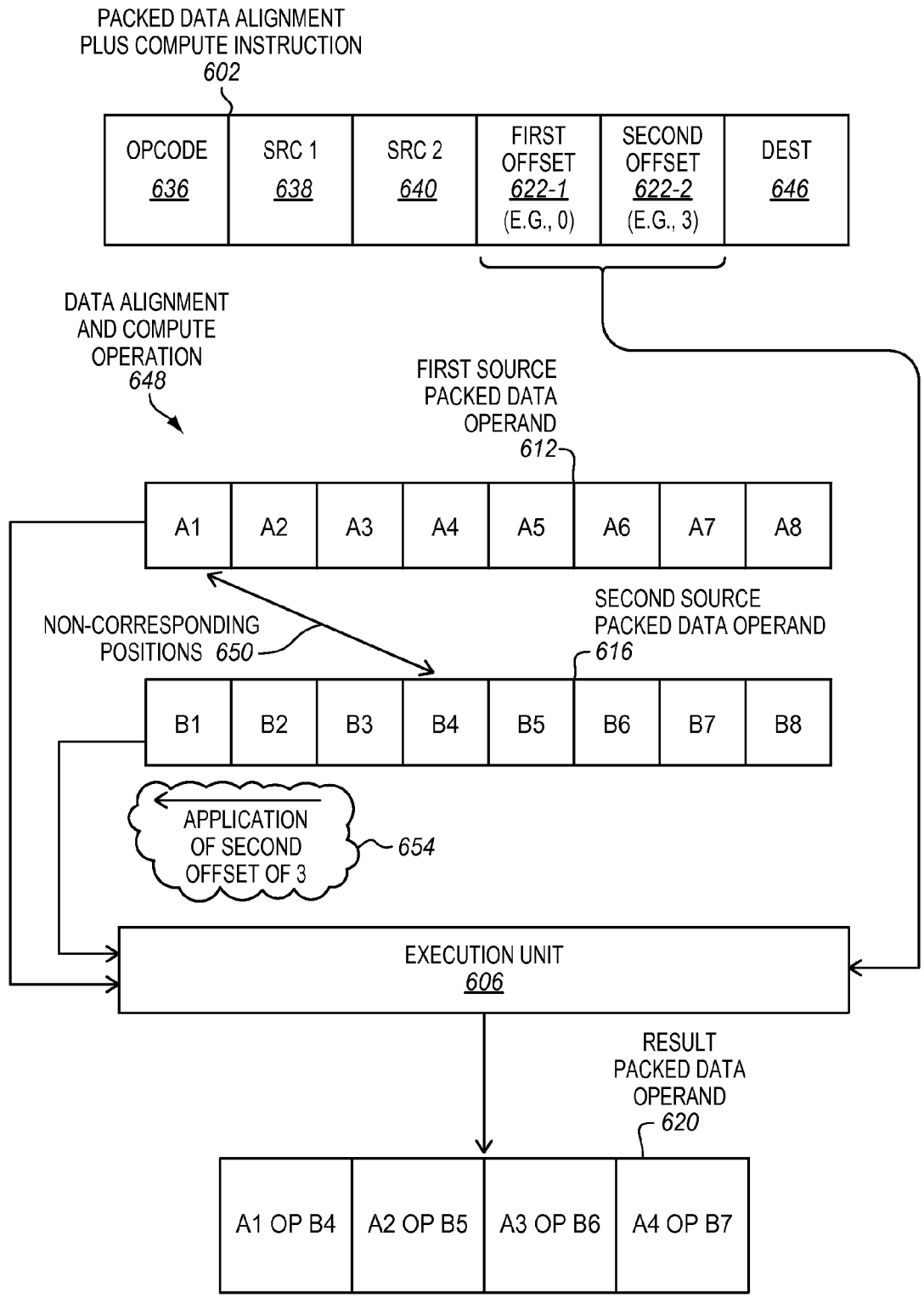
FIG. 6 is a block diagram illustrating a third embodiment of a packed data alignment plus compute operation.

FIG. 6 is a block diagram illustrating a third example embodiment of a packed data alignment plus compute operation 648 that may be performed in response to a third example embodiment of a packed data alignment plus compute instruction 602. The instruction and operation of FIG. 6 have certain similarities to the instruction and operation of FIG. 3. To avoid obscuring the description, the different and/or additional characteristics for the instruction and operation of FIG. 6 will primarily be described, without repeating all the optionally similar or common characteristics, details, variations, and alternatives relative to the instruction and operation of FIG. 3. However, it is to be appreciated that the previously described characteristics, details, variations, and alternatives of the instruction and operation of FIG. 3 may also optionally apply to the instruction and operation of FIG. 6, unless otherwise stated or clearly apparent.

The instruction 602 includes an opcode 636, a first source specification field (SRC1) 638 to specify a first source packed data operand 612, and a second source specification field (SRC2) 640 to specify a second source packed data operand 616. In this embodiment, the first source packed data operand 612 represents a first set of only a single source packed data operand. Likewise, the second source packed data operand 616 represents a second set of only a single source packed data operand. The instruction also optionally includes a destination specification field (DEST) 646 to specify a destination storage location where a result packed data operand 620 is to be stored. Each of these fields and operands may have the characteristics, details, variations, and alternatives previously described.

In this embodiment, the instruction also indicates a first data element offset 622-1 and a second data element offset 622-2. The first data element offset is to correspond to, and is to be applied to, the first source packed data operand 612, and the second data element offset is to correspond to, and is to be applied to, the second source packed data operand 616. In other embodiments, only a single data element offset may be used if desired (e.g., as described in conjunction with FIG. 5). The data element offsets, and their specification fields, may have the characteristics, details, variations, and alternatives previously described. In the illustrated example embodiment, the first data element offset indicates an offset of zero data element positions, and the second data element offset indicates an offset of three data element positions, although this is just one illustrative example. In other embodiments, each of the data element offsets, independent of one another, may be any one −4 to 4, 0 to 4, −2 to 2, 0 to 2, or some other number of data element positions (e.g., larger numbers of offsets may also be used if there are more data elements), depending upon the particular implementation. As before, each data element offset may be specified as a number of data elements, a number of bits, a shift amount in bits or data elements, a rotation amount in bits or data elements, or the like.

In the illustrated example embodiment, the first source packed data operand 612 (e.g., indicated by SRC1) has eight packed data elements A1-A8. The second source packed data operand 616 (e.g., indicated by SRC2) has eight packed data elements B1-B8. In other embodiments other numbers of data elements may optionally be used instead. Data elements in same relative data element positions in the first source packed data operand 612, and in the second source packed data operand 616, are in corresponding positions and/or are corresponding data elements. For example, A1 and B1 correspond, A7 and B7 correspond, and so on. In contrast, A1 and B4 are in non-corresponding data element positions and/or A1 and B4 are non-corresponding data elements in the source operands. In the illustrated embodiment, each of the source operands has more data elements than the result packed data operand (e.g., in this example twice as many data elements).

The third embodiment of the packed data alignment plus compute operation 648 may be performed in response to the third embodiment of the packed data alignment plus compute instruction 602. The execution unit, responsive to the packed data alignment plus compute instruction, may be operative to generate and store a result packed data operand 620 in the destination storage location. In the illustrated example embodiment the result packed data operand has four result data elements, although other embodiments may have fewer or more than four result data elements. In some embodiments, each of the result data elements may have a value of an operation (OP) performed with at least a pair of a data element in the first source packed data operand 612, and a non-corresponding data element in the second source packed data operand 616. The non-corresponding data elements of each pair may be in non-corresponding data element positions in the first and second source packed data operands. For example, in the illustrated example embodiment, a first result data element may have a value of the operation (OP) performed on A1 and B4, a second result data element may have a value of the operation (OP) performed on A2 and B5, a third result data element may have a value of the operation (OP) performed on A3 and B6, and a fourth result data element may have a value of the operation (OP) performed on A4 and B7. This is just one illustrative example. In other illustrative examples, the first offset may instead be one, three (e.g., the same as the second offset), four, ten, etc.

As before, in some embodiments, the non-corresponding data elements of each pair may be in non-corresponding data element positions in the first and second source packed data operands, in which the non-corresponding positions differ based on application of the first and second data element offsets. The non-corresponding data element positions may be such that the execution unit is operative to apply the first and second data element offsets to the first and second source packed data operands, respectively, to bring the non-corresponding data elements into correspondence. For example, B4 may be offset or otherwise moved by three data element positions so that it corresponds to A1 (e.g., has a same relative data element position). The execution unit may be operative to perform any of the various different types of operations (OP) on the aligned data elements as previously described. In some embodiments, the execution unit may perform "vertical" SIMD compute operations on only corresponding data elements. In other embodiments, the execution unit may perform a combination of both vertical and non-vertical SIMD compute operations involving a combination of corresponding data elements and non-corresponding data elements.

In some embodiments, the instructions disclosed herein may be used in pixel filtering in image processing, although the scope of the invention is not so limited. In filtering it is very common for a result filtered pixel to be calculated from a given input pixel as well as one or more pixels that neighbor the given input pixel. By way of example, a given pixel in a row of pixels may be filtered with adjacent neighboring pixels on both sides of the given pixel (e.g., with a normalizing convolution 1, 2, 1 coefficient filter). Traditionally, implementing filters in a SIMD vector processor is done using a repeated alignment of data, each time followed by a SIMD operation. In imaging and vision, such filters are heavily used in two-dimensional (2D) forms of size 3×3, 5×5, 7×7, etc., which respectively may involve nine, twenty-five, and forty-nine alignment operations, each potentially be a separate packed data alignment instruction (unless the instructions disclosed herein are used). Especially when implemented in an embedded digital signal processor, or other generally resource constrained environment, the cost in cycles to perform the extra alignment operations and/or the extra register space needed to store the intermediate results of the alignment instructions, may significantly affect overall efficiency.

In many of the embodiments described above, different sets of one or more source packed data operations have been shown and described (e.g. sets 112 and 116 in FIG. 1). In some uses and implementations, the same data (e.g., in one single set of one or more source packed data operands) may be used for the operation. One way to achieve this is to specify the same registers or other storage locations for both sets of one or more source packed data operands. For example, the instruction may specify a pair of registers R1 and R2 for the set 112 and may also specify the registers R1 and R2 for the sets 116. Alternatively, a single set of one or more packed data operands (e.g., set 112) may be specified by the instruction (e.g., the registers R1 and R2 may be specified) and it may be implicit or implied by the instruction (e.g., an opcode thereof) to use the single set of source packed data operands 112 for both the first and second sets of source packed data operands 112, 116. The instruction may omit the extra source specification fields (e.g., SRC2, SRC3). In some embodiments, the data elements of all the source operands may optionally all be pixels of a same row of pixels of an image. For example, in pixel filtering in image processing in order to average pixels with their neighbors (e.g., to implement a normalizing convolution of pixels with the filter coefficients 1,2,1), as well as in various other applications, it is often useful to be able offset different copies or replicas of the same set of source packed data operands multiple times with different offsets applied to each copy or replica (e.g., zero, one, and two data element offsets applied to three replicas in the case of the normalizing convolution of pixels with the filter coefficients 1,2,1). Accordingly, alternative embodiments to those disclosed above may indicate only a single set of one or more source packed data operands (e.g., 112) and implicitly or inherently reuse a copy or replica of that indicated set (e.g., instead of an explicit set 116).

Figure 7:
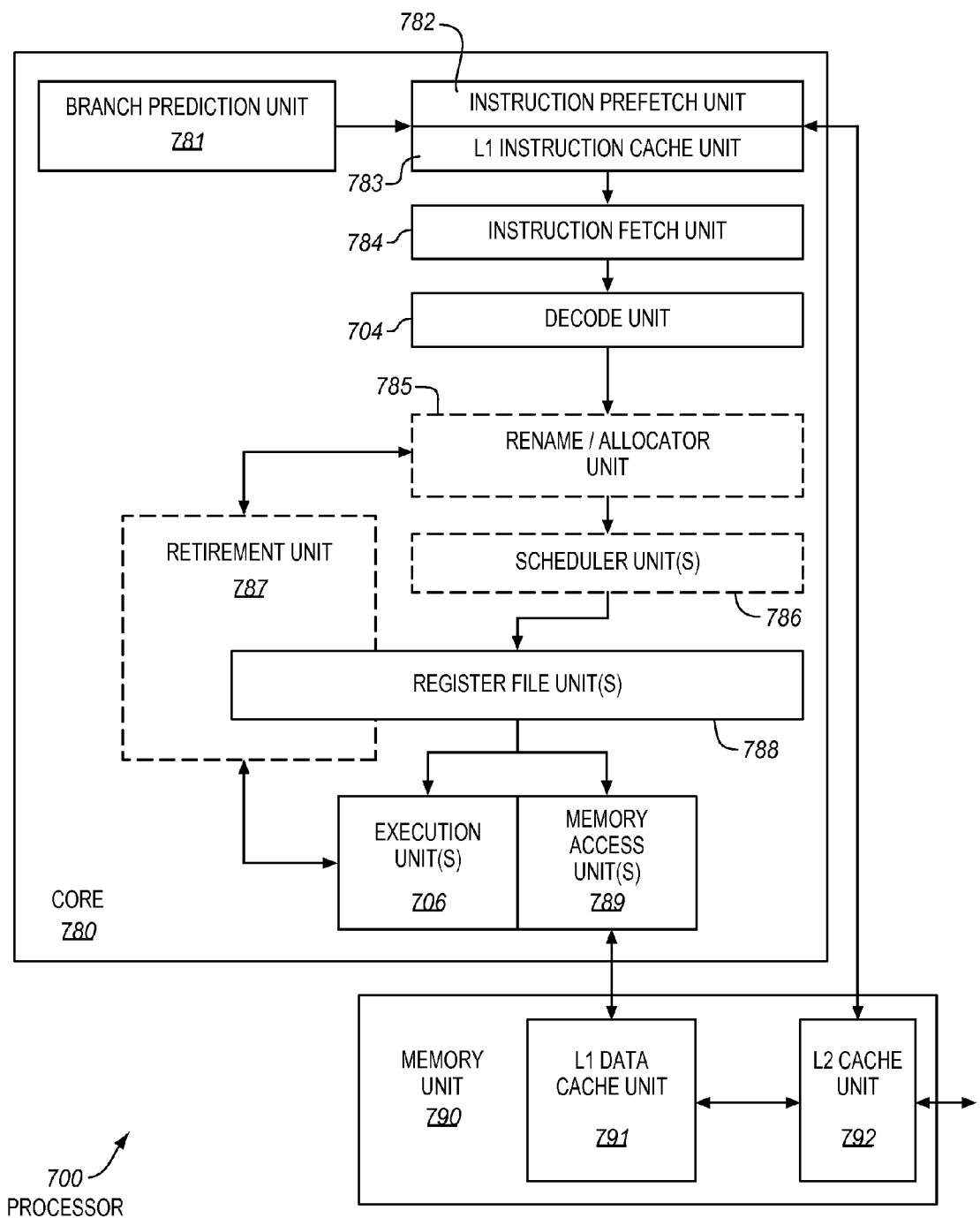
FIG. 7 is a block diagram of a detailed example embodiment of a processor that is suitable for implementing embodiments of the invention.

FIG. 7 is a block diagram of a detailed example embodiment of a processor 700 that is suitable for implementing embodiments of the invention. The processor includes at least one core 780 that is able to perform an embodiment of a packed data alignment plus compute instruction. The core includes a branch prediction unit 781 to predict branches in program flow. The branch prediction unit is coupled with an instruction prefetch unit 782. The instruction prefetch unit may prefetch or otherwise receive instructions, including the packed data alignment plus compute instruction, from memory (e.g., through a memory unit 790). A level 1 (L1) instruction cache 783 is coupled with the instruction prefetch unit. The L1 instruction cache may cache or otherwise store instructions, including the packed data alignment plus compute instruction. The processor also includes an L1 data cache 791 to cache or otherwise store data, including data elements and/or operands for instructions. The processor also optionally includes a level 2 (L2) cache 792. The L2 cache may be dedicated to the core, or shared by the core and one or more other optional cores (not shown). The L2 cache may store data and instructions, including the packed data alignment plus compute instruction. An instruction fetch unit 784 is coupled with the L1 instruction cache, the L2 cache, and a decode unit 704. The instruction fetch unit may fetch or otherwise receive instructions, including the packed data alignment plus compute instruction (e.g., from the L1 instruction cache or the L2 cache), and may provide the instructions to the decode unit. The decode unit may decode the instructions, including the packed data alignment plus compute instruction, as described elsewhere herein.

The processor also includes one or more register file units 788. The register file unit(s) may include various different types of registers, such as, for example, packed data registers, general-purpose registers, a status or flags register, control or configuration registers, etc. In an embodiment where the core optionally supports out-of-order (OOO) execution, the core may also optionally include a register rename/allocator unit 785 coupled with the register file unit(s) to allocate resources and perform register renaming on registers (e.g., packed data registers associated with the packed data alignment plus compute instruction). Further, for OOO execution, the core may optionally include one or more scheduler units 786 coupled with the decode unit, the rename/allocator unit, and one or more execution units 706, 789. The scheduler unit(s) may schedule one or more operations associated with decoded instructions, including one or more operations decoded from the packed data alignment plus compute instruction, for execution on the execution units. The core may optionally have multiple different types of execution units, such as, for example integer execution units, floating point execution units, vector execution units, one or more memory access units 789, and the like. For OOO execution, the core may optionally include a retirement or commit unit 787 coupled with the execution units, the register file unit(s), and the rename/allocator unit. The retirement or commit unit may be operative to retire or commit instructions.

It is to be appreciated that this is just one illustrate example of a suitable processor. In alternate embodiments the processor may include either fewer or more components. Examples of other components that may optionally be included are one or more instruction and/or data translation lookaside buffers (TLBs), one or more reorder buffers (ROBs), a reservation station, an address generation unit, a debug unit, a performance monitor unit, a power management unit. Moreover, the processor may optionally have multiple cores (e.g. at least two, at least four, at least eight, at least thirty, etc.). In some cases, all of the cores may have the same components and support the same instruction sets as the core 780. Alternatively, at least some of the cores may have different components and/or may support different instruction sets.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
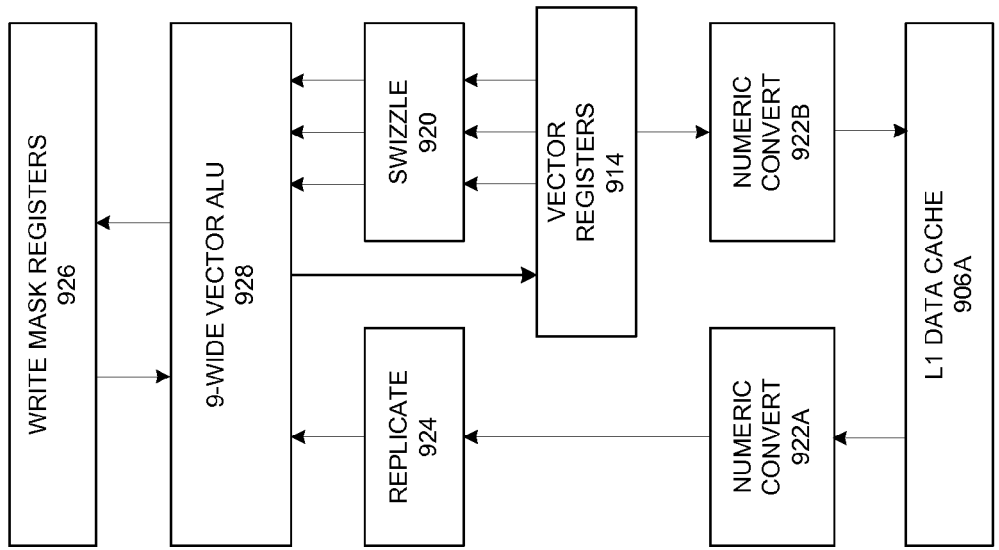
FIG. 9B is a block diagram of an embodiment of an expanded view of part of the processor core of FIG. 9A.
Figure 9A:
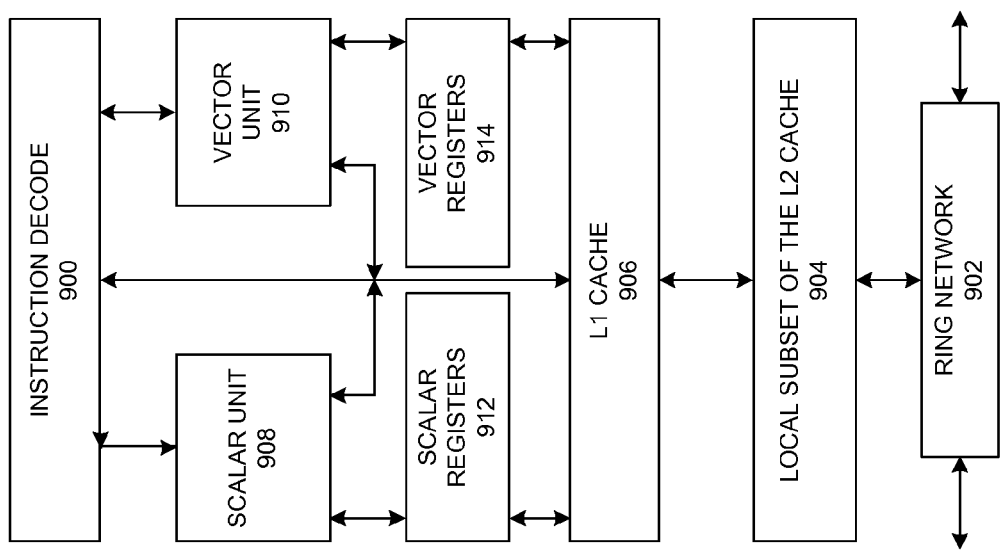
FIG. 9A is a block diagram of an embodiment of a single processor core, along with its connection to the on-die interconnect network, and with its local subset of the Level 2 (L2) cache.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 1912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
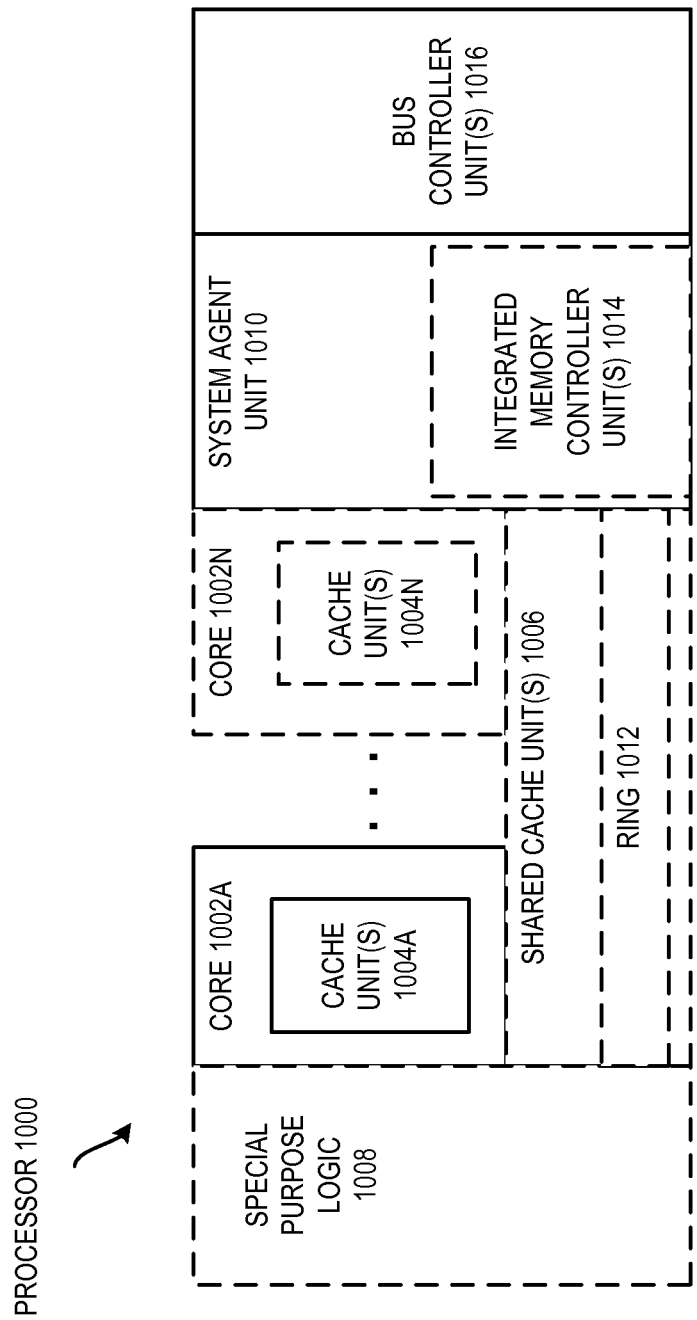
FIG. 10 is a block diagram of an embodiment of a processor that may have more than one core, may have an integrated memory controller, and may have integrated graphics.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
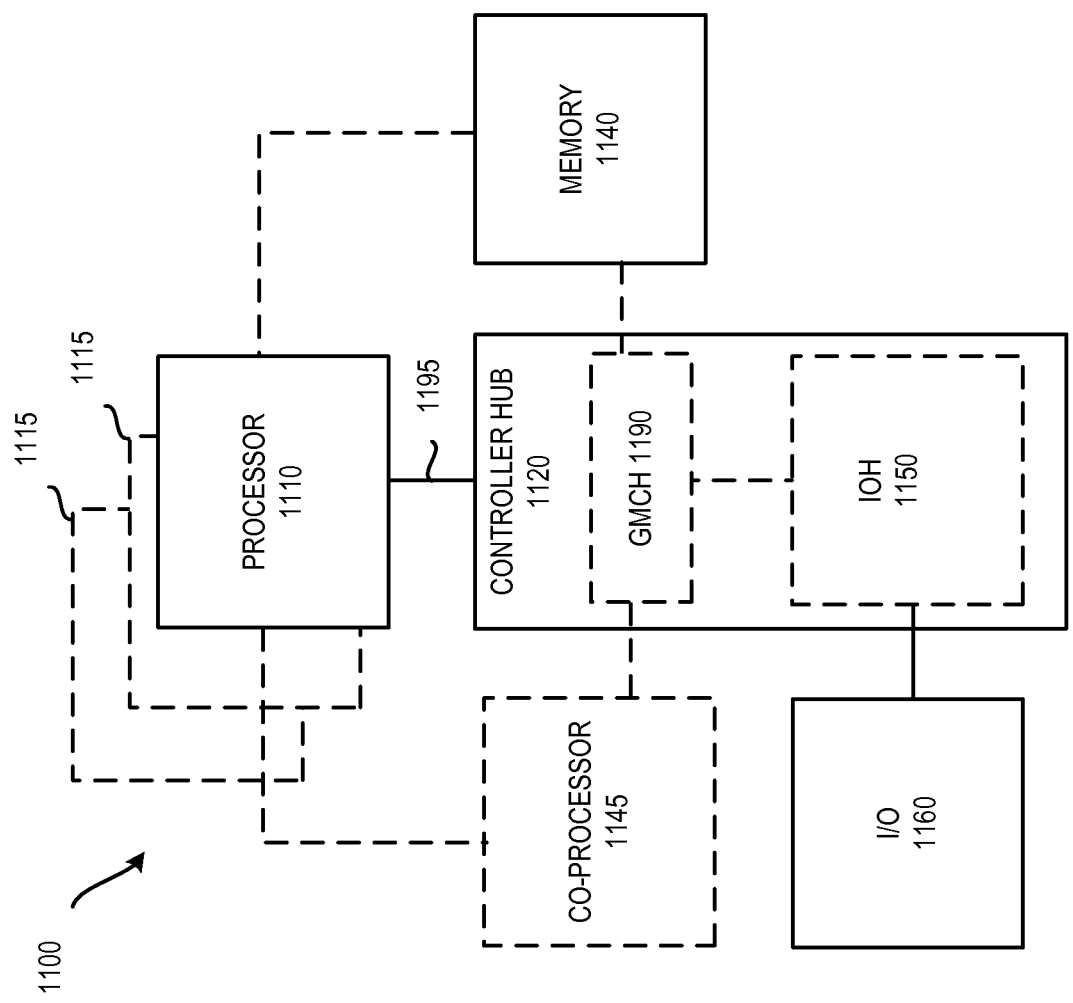
FIG. 11 is a block diagram of a first embodiment of a computer architecture.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
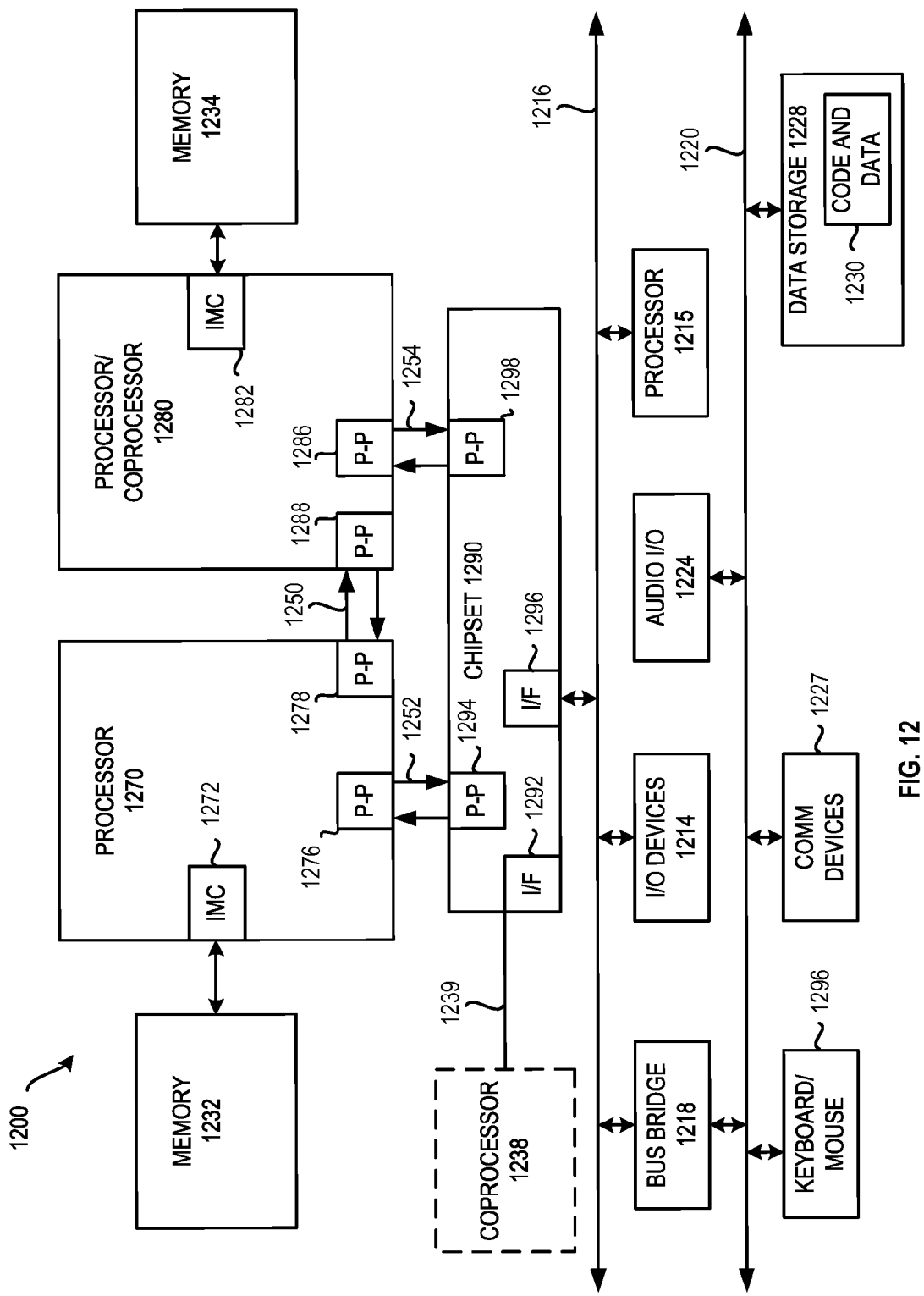
FIG. 12 is a block diagram of a second embodiment of a computer architecture.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
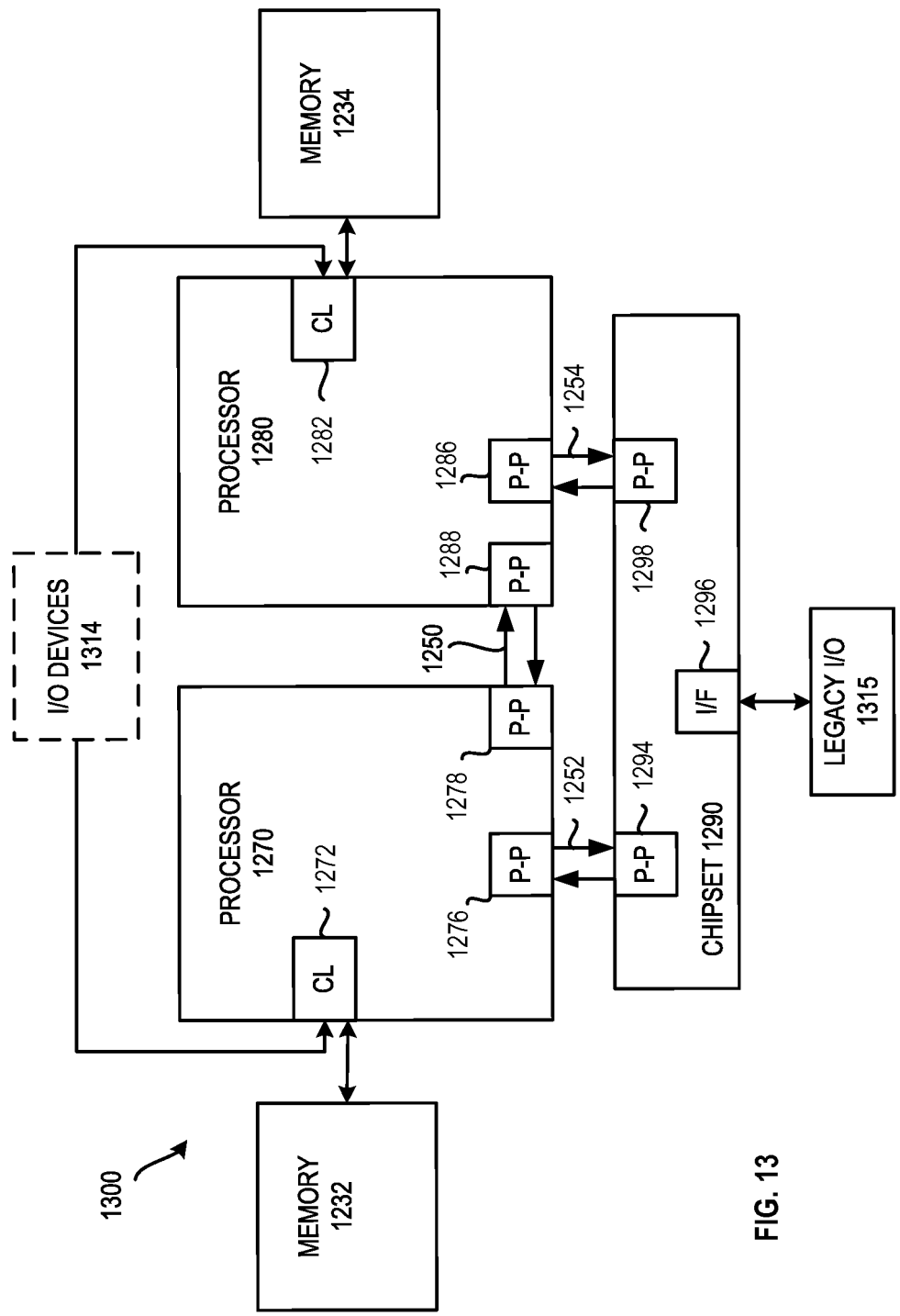
FIG. 13 is a block diagram of a third embodiment of a computer architecture.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
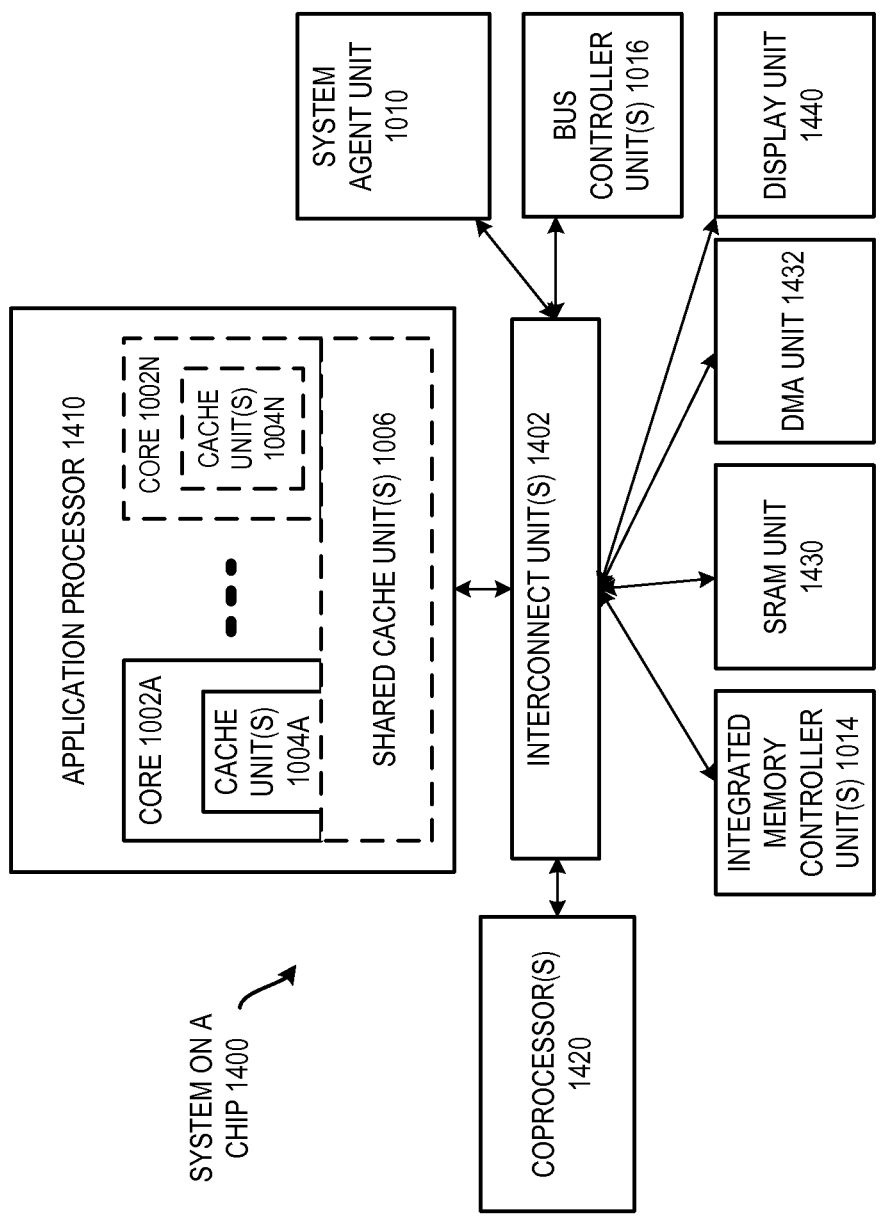
FIG. 14 is a block diagram of a fourth embodiment of a computer architecture.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 132A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
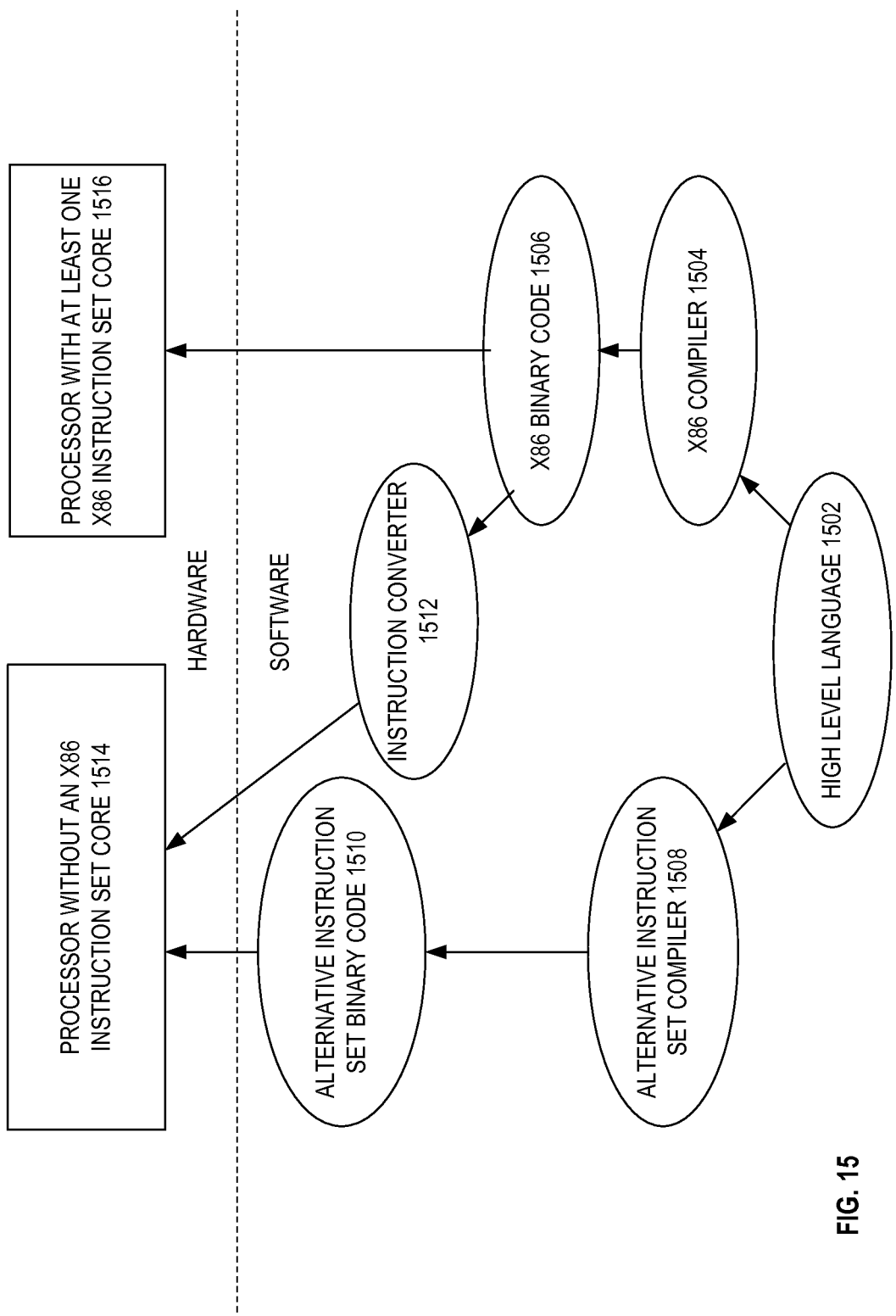
FIG. 15 is a block diagram of use of a software instruction converter to convert binary instructions in a source instruction set to binary instructions in a target instruction set, according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Components, features, and details described for any of FIGS. 3-7 may also optionally apply to any of FIGS. 1-2. Moreover, components, features, and details described for any of the apparatus may also optionally apply to any of the methods, which in embodiments may be performed by and/or with such apparatus. Any of the processors described herein may be included in any of the computer systems disclosed herein (e.g., FIGS. 11-14). In some embodiments, the computer system may include a dynamic random access memory (DRAM). Alternatively, the computer system may include a type of volatile memory that does not need to be refreshed or flash memory. The instructions disclosed herein may be performed with any of the processors shown herein, having any of the microarchitectures shown herein, on any of the systems shown herein.

In the description and claims, the terms "coupled" and/or "connected," along with their derivatives, may have been used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor or other apparatus that includes a decode unit to decode a packed data alignment plus compute instruction. The packed data alignment plus compute instruction is to indicate a first set of one or more source packed data operands that is to include a first plurality of data elements, to indicate a second set of one or more source packed data operands that is to include a second plurality of data elements, to indicate at least one data element offset, and to indicate a destination storage location. The apparatus also includes an execution unit coupled with the decode unit. The execution unit, in response to the packed data alignment plus compute instruction, is to store a result packed data operand in the destination storage location. The result packed data operand is to include a plurality of result data elements that are each to have a value of an operation performed with a pair of a data element of the first set of source packed data operands and a data element of the second set of source packed data operands. The execution unit is to apply the at least one data element offset to at least a corresponding one of the first and second sets of source packed data operands. The at least one data element offset is to counteract any lack of correspondence between the data elements of each pair in the first and second sets of source packed data operands.

Example 2 includes the processor of Example 1, in which the decode unit is to decode the instruction that is to indicate only a single data element offset that is to correspond to the second set of one or more source packed data operands. Also, optionally in which the data elements of each pair are to have a lack of correspondence that is to be counteracted by the at least one data element offset.

Example 3 includes the processor of Example 1, in which the decode unit is to decode the instruction that is to indicate a first data element offset that is to correspond to the first set of one or more source packed data operands, and a second data element offset that is to correspond to the second set of one or more source packed data operands.

Example 4 includes the processor of Example 3, in which the data elements of each pair are to have a lack of correspondence that is to be counteracted by application of the first data element offset to the first set of one or more source packed data operands and application of the second data element offset to the second set of one or more source packed data operands.

Example 5 includes the processor of Example 1, in which the decode unit is to decode the instruction that is to indicate the first set of the source packed data operands that is to include a first source packed data operand and a second source packed data operand, and the second set of the source packed data operands that is to include a third source packed data operand and a fourth source packed data operand.

Example 6 includes the processor of Example 1, in which the decode unit is to decode the instruction that is to indicate the first set of the one or more source packed data operands that is to include only a single first source packed data operand, and the second set of the source packed data operands that is to include a second source packed data operand and a third source packed data operand.

Example 7 includes the processor of Example 6, in which the result packed data operand is optionally to include a same number of data elements as each of the first source packed data operand and the second source packed data operand.

Example 8 includes the processor of Example 1, in which the decode unit is to decode the instruction that is to indicate the first set of the one or more source packed data operands that is to include only a single first source packed data operand, and the second set of the one or more source packed data operands that is to include only a single second source packed data operand, and in which the execution unit is to store the result packed data operand that is optionally to have less data elements than the second source packed data operand.

Example 9 includes the processor of any one of Examples 1 to 8, in which the decode unit is to decode the instruction that is to indicate a data element offset of the at least one data element offset that is able to have any one of a plurality of different data element offset values.

Example 10 includes the processor of any one of Examples 1 to 8, in which the decode unit is to decode the instruction that is to indicate a data element offset of the at least one data element offset that is capable of being any one of: (1) an offset in a direction toward a least significant bit position of either one of at least one and two data element positions; (2) an offset of zero data element positions; and (3) an offset in a direction toward a most significant bit position of either one of at least one and two data element positions.

Example 11 includes the processor of any one of Examples 1 to 8, in which the decode unit is to decode the instruction that is to indicate a data element offset of the at least one data element offset that is capable of being any one of: (1) an offset in a direction toward a least significant bit position of either one of at least one, two, three, and four data element positions; (2) an offset of zero data element positions; and (3) an offset in a direction toward a most significant bit position of either one of at least one, two, three, and four data element positions.

Example 12 includes the processor of any one of Examples 1 to 8, in which the execution unit, in response to the instruction, is to store the result packed data operand that is to have the result data elements are each to have the value of the operation performed with the pair of the data elements, in which the operation is optionally to be one of an addition, a subtraction, a multiplication, a division, and an average operation.

Example 13 includes the processor of any one of Examples 1 to 8, in which the execution unit, in response to the instruction being decoded, is to perform vertical single-instruction, multiple-data (SIMD) operations on the data elements of each pair.

Example 14 includes the processor of any one of Examples 1 to 8, in which the decode unit is to decode the instruction that is optionally to have an immediate to indicate a value of a data element offset of the at least one data element offset.

Example 15 includes the processor of any one of Examples 1 to 8, in which the decode unit is to decode the instruction that is optionally to indicate a scalar register that is to store a value that is to indicate a value of a data element offset of the at least one data element offset.

Example 16 includes the processor of any one of Examples 1 to 8, further including an image processor unit of a digital signal processor having the execution unit.

Example 17 includes the processor of any one of Examples 1 to 8, further including an optional branch prediction unit to predict branches. The processor may also include an optional instruction prefetch unit coupled with the branch prediction unit to prefetch instructions including the packed data alignment plus compute instruction. The processor may also include an optional level 1 (L1) instruction cache coupled with the instruction prefetch unit to store instructions. The processor may also include an optional L1 data cache to store data. The processor may also include an optional level 2 (L2) cache to store data and instructions. The processor may also include an instruction fetch unit coupled with the decode unit, the L1 instruction cache, and the L2 cache, to fetch the packed data alignment plus compute instruction from one of the L1 instruction cache and the L2 cache, and to provide the packed data alignment plus compute instruction to the decode unit. The processor may also include an optional register rename unit to rename registers. The processor may also include an optional scheduler to schedule one or more operations that have been decoded from the packed data alignment plus compute instruction for execution. The processor may also include an optional commit unit to commit execution results of the packed data alignment plus compute instruction.

Example 18 is a method in a processor that includes receiving a packed data alignment plus compute instruction. The packed data alignment plus compute instruction may indicating a first set of one or more source packed data operands that include a first plurality of data elements, indicating a second set of one or more source packed data operands that include a second plurality of data elements, indicating at least one data element offset, and indicating a destination storage location. The method also includes storing a result packed data operand in the destination storage location in response to the packed data alignment plus compute instruction. The result packed data operand including a plurality of result data elements that each have a value of an operation performed with a pair of a data element from the first set of source packed data operands and a data element from the second set of source packed data operands. The data elements of each pair were in non-corresponding data element positions in the first and second sets of source packed data operands. The non-corresponding data element positions differed based on the at least one data element offset indicated by the packed data alignment plus compute instruction.

Example 19 includes the method of Example 18, in which receiving includes receiving the instruction that indicates only a single data element offset, and in which the non-corresponding data element positions differ by the single data element offset.

Example 20 includes the method of Example 18, in which receiving includes receiving the instruction that indicates a first data element offset that corresponds to the first set of the one or more source packed data operands, and a second data element offset that corresponds to the second set of the one or more source packed data operands. The non-corresponding data element positions optionally differ by a difference between the first and second data element offsets.

Example 21 includes the method of Example 18, in which receiving includes receiving the instruction that indicates a first source packed data operand and a second source packed data operand both of the first set of the source packed data operands, and that indicates a third source packed data operand and a fourth source packed data operand both of the second set of the source packed data operands.

Example 22 includes the method of Example 18, in which receiving includes receiving the instruction that indicates a data element offset that can be any one of a plurality of different data element offset values.

Example 23 includes the method of any one of Examples 18 to 22, in which storing includes storing the result data elements that each have the value of the operation performed with the pair of the data elements, in which the operation is optionally one of an addition operation, a subtraction operation, a multiplication operation, a division operation, and an average operation.

Example 24 includes the method of any one of Examples 18 to 22, further including performing the operations with the pairs of the data elements as vertical single-instruction, multiple-data (SIMD) operations.

Example 25 includes the method of any one of Examples 18 to 22, performed during pixel filtering during image processing with a digital signal processor.

Example 26 is a system to process instructions that includes an interconnect and a processor coupled with the interconnect. The processor is to receive a packed data alignment plus compute instruction that is to indicate a first set of one or more source packed data operands that is to include a first plurality of data elements, to indicate a second set of one or more source packed data operands that is to include a second plurality of data elements, to indicate at least one data element offset, and to indicate a destination storage location. The processor, in response to the instruction, is to store a result packed data operand in the destination storage location. The result packed data operand is to include a plurality of result data elements that are each to have a value of an operation performed with a pair of a data element of the first set of source packed data operands and a data element of the second set of source packed data operands. The processor is to apply the at least one data element offset to at least a corresponding one of the first and second sets of source packed data operands. The at least one data element offset is to counteract any lack of correspondence between the data elements of each pair in the first and second sets of source packed data operands. The system also includes a dynamic random access memory (DRAM) coupled with the interconnect. The DRAM storing a set of instructions to perform a pixel filter algorithm. The set of instructions, when executed by the processor, to cause the processor to perform multiple instances of the packed data alignment plus compute instruction each with a different offset.

Example 27 includes the system of Example 26, in which the instruction indicates a first data element offset that can be any one of a plurality of different values. The data elements of each pair may optionally be in non-corresponding data element positions in the first and second sets of source operands.

Example 28 is an article of manufacture including a non-transitory machine-readable storage medium, the non-transitory machine-readable storage medium storing a packed data alignment plus compute instruction. The instruction is to indicate a first set of one or more source packed data operands that is to include a first plurality of data elements, to indicate a second set of one or more source packed data operands that is to include a second plurality of data elements, to indicate at least one data element offset, and to indicate a destination storage location. The instruction if executed by a machine is to cause the machine to perform operations including store a result packed data operand in the destination storage location. The result packed data operand is to include a plurality of result data elements that are each to have a value of an operation performed with a pair of a data element from the first set of source packed data operands and a data element from the second set of source packed data operands. The data elements of each pair are to have been in non-corresponding data element positions in the first and second sets of source packed data operands. The non-corresponding data element positions are to differed based on the at least one data element offset to be indicated by the packed data alignment plus compute instruction.

Example 29 includes the article of manufacture of example 28, in which the instruction is to indicate a data element offset of the at least one data element offset that is capable of being any one of: (1) an offset in a direction toward a least significant bit position of either one of at least one and two data element positions; (2) an offset of zero data element positions; and (3) an offset in a direction toward a most significant bit position of either one of at least one and two data element positions.

Example 30 is a processor or other apparatus including a decode unit to decode a packed data alignment plus compute instruction. The packed data alignment plus compute instruction is to indicate a first set of one or more source packed data operands that is to include a first plurality of data elements, to indicate a second set of one or more source packed data operands that is to include a second plurality of data elements, to indicate at least one data element offset, and to indicate a destination storage location. The processor also includes an execution unit coupled with the decode unit. The execution unit, in response to the packed data alignment plus compute instruction, is to store a result packed data operand in the destination storage location. The result packed data operand is to include a plurality of result data elements that are each to have a value of an operation performed with a pair of a data element of the first set of source packed data operands and a non-corresponding data element of the second set of source packed data operands. The non-corresponding data elements of each pair are to be in non-corresponding data element positions in the first and second sets of source packed data operands. The non-corresponding data element positions are to differ based on the at least one data element offset indicated by the packed data alignment plus compute instruction.

Example 31 is a processor or other apparatus to perform or operative to perform the method of any one of Examples 18 to 25.

Example 32 is a processor or other apparatus that includes means for performing the method of any one of Examples 18 to 25.

Example 33 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 18 to 25.

Example 34 is a processor or other apparatus substantially as described herein.

Example 35 is a processor or other apparatus that is operative to perform any method substantially as described herein.

Example 36 is a processor or other apparatus to perform (e.g., that has components to perform or that is operative to perform) any packed data alignment plus compute instruction substantially as described herein.

Example 37 is a computer system or other electronic device that includes a processor having a decode unit to decode instructions of a first instruction set. The processor also has one or more execution units. The electronic device also includes a storage device coupled with the processor. The storage device is to store a first instruction, which may be any of the packed data alignment plus compute instructions substantially as disclosed herein, and which is to be of a second instruction set. The storage device is also to store instructions to convert the first instruction into one or more instructions of the first instruction set. The one or more instructions of the first instruction set, when performed by the processor, are to cause the processor to have an architectural affect as specified by the first instruction.

What is claimed is:
1. A processor comprising:
a decode unit to decode a packed data alignment plus compute instruction, the packed data alignment plus compute instruction to indicate a first set of one or more source packed data operands that is to include a first plurality of data elements, to indicate a second set of one or more source packed data operands that is to include a second plurality of data elements, to indicate at least one data element offset, and to indicate a destination storage location, wherein the first set of the one or more source packed data operands is to include only a single first source packed data operand, and wherein the second set of the one or more source packed data operands is to include a second source packed data operand and a third source packed data operand; and
an execution unit coupled with the decode unit, the execution unit, in response to the packed data alignment plus compute instruction, to store a result packed data operand in the destination storage location, the result packed data operand to include a plurality of result data elements that are each to have a value of an operation performed with a pair of a data element of the first set of source packed data operands and a data element of the second set of source packed data operands, wherein the execution unit is to apply the at least one data element offset to at least a corresponding one of the first and second sets of source packed data operands, and wherein the at least one data element offset is to counteract any lack of correspondence between the data elements of each pair in the first and second sets of source packed data operands.

2. The processor of claim 1, wherein the decode unit is to decode the instruction that is to indicate only a single data element offset that is to correspond to the second set of the source packed data operands, and wherein the data elements of each pair are to have a lack of correspondence that is to be counteracted by the at least one data element offset.

3. The processor of claim 1, wherein the result packed data operand is to include a same number of data elements as each of the first source packed data operand and the second source packed data operand.

4. The processor of claim 1, wherein the decode unit is to decode the instruction that is to indicate a data element offset of the at least one data element offset that is able to have any one of a plurality of different data element offset values.

5. The processor of claim 1, wherein the decode unit is to decode the instruction that is to indicate a data element offset of the at least one data element offset that is capable of being any one of:
- an offset in a direction toward a least significant bit position of either one of at least one and two data element positions;
- an offset of zero data element positions; and
- an offset in a direction toward a most significant bit position of either one of at least one and two data element positions.

6. The processor of claim 1, wherein the decode unit is to decode the instruction that is to indicate a data element offset of the at least one data element offset that is capable of being any one of:
- an offset in a direction toward a least significant bit position of either one of at least one, two, three, and four data element positions;
- an offset of zero data element positions; and
- an offset in a direction toward a most significant bit position of either one of at least one, two, three, and four data element positions.

7. The processor of claim 1, wherein the execution unit, in response to the instruction, is to store the result packed data operand that is to have the result data elements are each to have the value of the operation performed with the pair of the data elements, in which the operation is to be one of an addition, a subtraction, a multiplication, a division, and an average operation.

8. The processor of claim 1, wherein the execution unit, in response to the instruction being decoded, is to perform vertical single-instruction, multiple-data (SIMD) operations on the data elements of each pair.

9. The processor of claim 1, wherein the decode unit is to decode the instruction that is to at least one of: (1) have an immediate to indicate a value of a data element offset of the at least one data element offset; and (2) indicate a scalar register that is to store a value that is to indicate a value of a data element offset of the at least one data element offset.

10. The processor of claim 1, further comprising an image processor unit of a digital signal processor having the execution unit.

11. A system comprising:
an interconnect;
the processor of claim 1 coupled with the interconnect; and
a dynamic random access memory (DRAM) coupled with the interconnect.

12. A system comprising:
an interconnect;
the processor of claim 1 coupled with the interconnect; and
a memory coupled with the interconnect, the memory storing a set of instructions to perform a pixel filter algorithm, the set of instructions, when executed by the processor, to cause the processor to perform multiple instances of the packed data alignment plus compute instruction each with a different offset.

13. A processor comprising:
a decode unit to decode a packed data alignment plus compute instruction, the packed data alignment plus compute instruction to indicate a first set of one or more source packed data operands that is to include a first plurality of data elements, to indicate a second set of one or more source packed data operands that is to include a second plurality of data elements, to indicate at least one data element offset, and to indicate a destination storage location, wherein the instruction is to indicate a first data element offset that is to correspond to the first set of one or more source packed data operands, and a second data element offset that is to correspond to the second set of one or more source packed data operands; and
an execution unit coupled with the decode unit, the execution unit, in response to the packed data alignment plus compute instruction, to store a result packed data operand in the destination storage location, the result packed data operand to include a plurality of result data elements that are each to have a value of an operation performed with a pair of a data element of the first set of source packed data operands and a data element of the second set of source packed data operands, wherein the execution unit is to apply the at least one data element offset to at least a corresponding one of the first and second sets of source packed data operands, and wherein the at least one data element offset is to counteract any lack of correspondence between the data elements of each pair in the first and second sets of source packed data operands.

14. The processor of claim 13, wherein the data elements of each pair are to have a lack of correspondence that is to be counteracted by application of the first data element offset to the first set of one or more source packed data operands and application of the second data element offset to the second set of one or more source packed data operands.

15. A processor comprising:
a decode unit to decode a packed data alignment plus compute instruction, the packed data alignment plus compute instruction to indicate a first set of one or more source packed data operands that is to include a first plurality of data elements, to indicate a second set of one or more source packed data operands that is to include a second plurality of data elements, to indicate at least one data element offset, and to indicate a destination storage location, wherein the first set of the source packed data operands is to include a first source packed data operand and a second source packed data operand, and the second set of the source packed data operands is to include a third source packed data operand and a fourth source packed data operand; and
an execution unit coupled with the decode unit, the execution unit, in response to the packed data alignment plus compute instruction, to store a result packed data operand in the destination storage location, the result packed data operand to include a plurality of result data elements that are each to have a value of an operation performed with a pair of a data element of the first set of source packed data operands and a data element of the second set of source packed data operands, wherein the execution unit is to apply the at least one data element offset to at least a corresponding one of the first and second sets of source packed data operands, and wherein the at least one data element offset is to counteract any lack of correspondence between the data elements of each pair in the first and second sets of source packed data operands.

16. A processor comprising:

a plurality of packed data registers;

a decode unit to decode a packed data instruction, the packed data instruction to indicate a first set of one or more source packed data operands that is to include a first plurality of data elements, to indicate a second set of one or more source packed data operands that is to include a second plurality of data elements, to indicate a data element offset, and to indicate a destination packed data register, wherein the data element offset represents an integer number of data element positions; and an execution unit coupled with the decode unit and coupled with the plurality of packed data registers, the execution unit, in response to the decode of the packed data instruction, to:

apply the data element offset to the first set of one or more source packed data operands;

after the application of the data element offset to the first set of one or more source packed data operands, perform an operation on each of a third plurality of pairs of data elements of the first and second sets of source packed data operands to generate the third plurality of result data elements, wherein the data elements of each pair are to be in vertical single instruction, multiple data (SIMD) alignment, and wherein the third plurality is less than the second plurality; and store a result packed data operand including the third plurality of result data elements in the destination packed data register.

* * * * *